United States Patent [19]

Takahashi et al.

[11] Patent Number: 5,537,528
[45] Date of Patent: Jul. 16, 1996

[54] SYSTEM AND METHOD FOR INPUTTING SCENE INFORMATION

[75] Inventors: Junichi Takahashi; Masahiro Kusaba; Jung-Kook Hong, all of Tokyo, Japan

[73] Assignee: International Business Machines Corporation, Armonk, N.Y.

[21] Appl. No.: 17,939

[22] Filed: Feb. 16, 1993

[30] Foreign Application Priority Data

May 28, 1992 [JP] Japan .................................. 4-160034

[51] Int. Cl.$^6$ ............................................ G06F 15/00
[52] U.S. Cl. ........................ 395/154; 395/160; 395/161
[58] Field of Search .................................. 395/152, 154, 395/156, 159, 160, 161

[56] References Cited

U.S. PATENT DOCUMENTS

| | | | |
|---|---|---|---|
| 5,101,364 | 3/1992 | Davenport et al. | 395/152 |
| 5,107,343 | 4/1992 | Kawai | 358/341 |
| 5,109,482 | 4/1992 | Bohrman | 395/154 |
| 5,179,449 | 1/1993 | Doi | 358/311 |
| 5,189,630 | 2/1993 | Barstow et al. | 364/514 |
| 5,191,645 | 3/1993 | Carlucci et al. | 395/159 |
| 5,206,929 | 4/1993 | Langford et al. | 395/159 |
| 5,237,648 | 8/1993 | Mills et al. | 395/133 |
| 5,321,396 | 6/1994 | Lamming et al. | 340/825.49 |
| 5,388,197 | 2/1995 | Rayner | 395/154 |
| 5,404,316 | 4/1995 | Klingler et al. | 395/161 |

OTHER PUBLICATIONS

Poor, "The Audio Visual Connection Turnkey Multimedia From IBM", PC Magazine, vol. 9, No. 9 (May 15, 1990), pp. 157–169.

"Method of Detecting Scene Changes in Moving Pictures", IBM Technical Disclosure Bulletin, vol. 34 No. 10A (Mar. 1992) pp. 284–286.

Christodoulakis et al., "Browsing within time–driven multimedia documents", *Conf. on Office Information Systems*, pp. 219–227, Mar. 23, 1988.

Nagasaka et al., "Automatic video indexing and full–video search for object appearances", *Visual Database Systems II*, (Knuth & Wegner, eds.), pp. 113–126, 1992.

Mabrouk et al., "A hyperdocument model based on the ODA standard", *Proceeding of a Conf. on Intelligent Text and Image Handling*, pp. 245–263, 1991.

*Primary Examiner*—Mark K. Zimmerman
*Assistant Examiner*—Joseph R. Burwell
*Attorney, Agent, or Firm*—Whitham, Curtis, Whitham & McGinn; Louis J. Percello

[57] ABSTRACT

A scene information editor 12 extracts, for a plurality of scenes, still image data on the representative frames of scenes from a representative frame file, and arranges the still images along with a time axis and in chronological order along a time axis for display on the screen of a display. For the time period corresponding to the part of the time axis specified by a user, the editor extracts motion image data from an LD and displays the motion image data on a TV monitor. The scene information editor also extracts the information given to those scenes from a scene information file 21 and graphically displays the information on the screen of the display 14 at the same time. When the user inputs an edit command, the scene information editor executes it for the edit scene information file 21.

5 Claims, 23 Drawing Sheets

|     901 | 902  | 903  | 904 |
|--------:|-----:|-----:|----:|
|       0 |    0 | 1.00 |   1 |
|    .649 |  651 |  .12 |   1 |
|     855 |  857 |  .72 |   2 |
|    1127 | 1128 | 0.00 |   1 |
|    2014 | 2015 | 0.23 |   2 |
|    2290 | 2292 | 0.52 |   1 |
|    2471 | 2472 | 0.18 |   1 |
|      ⋮  |   ⋮  |   ⋮  |  ⋮  |

SYSTEM AND METHOD FOR INPUTTING SCENE INFORMATION

FIELD OF THE INVENTION

The present invention is related to a user interface for inputting information (hereinafter referred to as scene information) regarding scenes that are portions of a motion image. It is also related to a system and method for registering scene information in a motion image database through the creation of a file for storing such scene information (hereinafter referred to as a scene information file).

BACKGROUND OF THE INVENTION

Terms used in the specification are defined before the related art is described. It can be considered that a motion image consists of sequences of still frames. In the specification, any frame sequence constituting a portion of the whole motion image is called a scene. Scene information is distinguished from the frame image itself of a scene, and denotes information provided by a user or application program on an individual scene. In particular, it includes the position of a scene in the motion image (i.e., the starting and ending frame numbers and the time code), the semantic contents of a scene (i.e., the keywords, attributes, and representative frame), the relationship between scenes (i.e., the identifier of parent or child), and information on scene changes (i.e., the position of a change point in the motion image, the change type, and the probability).

Today, video equipment for media on which motion images are recorded, such as laser disk players and VTRs for VHS and 8-mm video tapes, is widely used, and the size of video image collections has increased remarkably, not only in media industries such as broadcasting and advertising companies, but also in museums, cinema-related companies handling video films, and even in private homes. If a user searches for scenes including a particular object or event in a large volume of video images while playing back the video images sequentially, it is difficult to locate the target scene in a short time.

Generally, in a motion image, a plurality of continuous scenes, when assembled, have a meaning as a single scene on a higher level, and thus motion images have a structural characteristic that scenes constitute a hierarchy. In addition, they have the temporal characteristic that an item such as a character, object, or background that can be a retrieval key of a scene appears in consecutive frames. In Patent Application No. 4-21443, submitted previously by the present applicant (May 11, 1994, Ser. No. 240,803 to T. Kaneko et al., abandoned Jun. 30, 1994, which was a continuation of filed Oct. 13, 1992, Ser. No. 959,820 to Kaneko et al., abandoned May 11, 1994), a motion image management system is disclosed in which, on the basis of such motion image characteristics, the original motion image is split into scenes of a shorter duration, and information on the hierarchy of scenes and descriptions of the semantic contents of scenes, or still images of representative frames of scenes, are prestored in a storage medium as index information, thereby allowing random retrieval of scenes.

FIG. 1 shows the concept of motion image management in the above-mentioned related art. Motion image 2, consisting of many (for instance, 30 per second) frames f1 to fn, is partitioned into a plurality of scenes 4 that are shorter in duration than the original motion image 2, as shown in FIG. 1 (a), according to physical changes in the frames, such as cuts, changes of camera angle, or changes in the semantic contents. The partitioning of the individual scenes 4 is relative and arbitrary. For instance, a certain scene can be split into a collection of scenes of shorter duration, and conversely, a plurality of consecutive scenes can be merged and viewed as a single scene on a higher level. To describe the logical structure of scenes based on such an inclusion relationship, a hierarchical tree 1 is created as shown in FIG. 1 (b). The entire motion image 2 corresponds to the root node (R) 5 of the hierarchical tree 1, and the split and merged scenes 4 correspond to the intermediate node 6 and leaf node 7. The arcs 3 indicating the lower and upper adjacent relationships of nodes represent the parent-child relationship of nodes. For each scene corresponding to one node of the hierarchical tree 1, one or more frames (rf) representative of that scene or representative frames 8 are defined, and their still image data (representative frame image data) are generated. In each node of the hierarchical tree, attribute data (At) 9 such as a title or description acting as a retrieval key for a scene are stored along with a reference pointer to the representative frame (rf).

As shown in FIG. 1 (a), to create this hierarchical tree, the system first automatically detects change points in frames f1 to fn of the original motion image 2 and splits the motion image 2 into minimum unit scenes (cut scenes) such as A11 and A12 in order to generate a one-depth tree structure. A user then appropriately merges adjacent cut scenes to form scenes whose contents are related, For instance, A1 may be created from A11 and A12, thereby creating a multi-depth tree structure in a bottom-up fashion. Alternatively, as shown in FIG. 2, the stored original motion image 2 may be split according to the user's decision into arbitrary scenes such as A, B and C, and each scene may then be further repeatedly split into arbitrary scenes of shorter durations (for instance, A may be split into A1, A2, and A3), thereby creating a tree structure in a top-down fashion. In every case, the multi-depth tree structure 1 is created by editing (splitting and merging repeatedly) scenes according to their semantic contents.

Scene retrieval is performed by matching of the attribute data 9 of nodes (5, 6, 7) in the hierarchical tree 1 and node navigation along the arcs 3, using scene information—in this case, the starting and ending frame numbers of each scene, the hierarchy, the attributes, and the representative frame image data and reference pointers thereto. That is, a retrieval condition is specified, which may be a scene attribute (At) or a condition for tracing the hierarchical tree, such as searching for a scene corresponding to the parent, child, or sibling node of the specified node in the hierarchical tree 1. The still images of representative frame 8 and attribute data 9 are displayed as a result of retrieval, and motion image data are accessed and played back for the scene 4 selected by the user from these still images.

FIG. 3 shows the structure of the scene information file disclosed in the above-identified prior application. FIG. 3 (a) shows the structure of a first file for storing the attribute data of scenes, in which one record is assigned to each scene 4 acting as a node of the hierarchical tree, and its identifier 80, its starting frame number 81, and the ending frame number 82 are stored. Further, the values 83 of attributes (At11, At12 ...) describing the contents of the scene, the frame number 84 of its representative frame, and the reference pointer 85 of its representative frame of the still image file 86 are also stored in the same record. As identifier 80 of a scene, for instance, a value is assigned that uniquely identifies the scene, for example, on the basis of the pair of starting frame number 81 and ending frame number 82. To specify the hierarchical relationship of scenes, a record in which the identifier 87 of a parent scene and the identifier 88 of a child scene are paired is stored in a second file, as shown in FIG. 3 (b).

However, since such scene information is input to a computer system by a human who describes the contents while actually viewing a motion image that has real-time characteristics, the conventional method causes a large bottleneck in the construction of a motion image database.

The problems with the conventional scene information input method are listed below.

The first problem is related to a procedure for detecting scene change points and identifying the starting and ending frame numbers of scenes. One example of an approach for automatically detecting physical scene changes is a technique described in Ioka, M., "A Method of Detecting Scene Changes in Moving Pictures," IBM TDB Vol. 34, No. 10A, pp. 284–286, March 1992. Generally, methods for detecting scene changes include comparison of the degree of change in the signal level between continuous frames, or the change in pixel value, with a threshold value. Because of this, the accuracy of such methods depends on the value to which the threshold is preset. If the threshold is set too low, the rate of detection failure (failure to detect a scene change point) decreases, but the rate of erroneous detection (deeming a point other than a scene change point to be a scene change point) increases; if the threshold is set too high, the result is the opposite. Usually, it is difficult to set the threshold so that there are no detection failure or erroneous detections. Accordingly, scene change points must be verified and corrected by the user while he or she is actually viewing the motion image. Nevertheless, no user interface for efficiently verifying and correcting scene change points has been described up to the present. Because of this, it is cumbersome for the user to instruct the system to play back or stop the motion image, for example, and mistakes are easily made.

The second problem is related to the procedure for describing a scene's contents. Although a text editor or the like is normally used to create a file describing the scene contents, no efficient data input procedure has yet been proposed. Because of this, users sometimes create unnecessary work files and work areas to write essentially the same scene information into different files. In addition, updating one file requires a cumbersome procedure such as a check by the user of the updated file's consistency with correlated files. Furthermore, since correlated information cannot be referred to for scene description, redundant operations such as repeated playback of the same scene and repeated input of the same frame number are required.

The third problem is related to the efficiency of the input operation in general. In the past, the user had to directly input character and numeric data such as frame numbers from an input device such as a keyboard, which was cumbersome. In addition, it was difficult to effectively feed back input scene information to find and correct input errors immediately.

In Ueda, H. et al., "A Proposal of an Interactive Video Image Editing Method Using Recognition Technology," Proceedings of the Institute of Electronics and Communication Information Engineers, D-II, Vol. J75-D-II, No. 2, pp. 216–225, Feb. 1992, a technique is disclosed for automatically splitting an original motion image into scenes, and displaying the image of the leading frame of each scene on a display device in order to browse scenes that are to be subjected to editing (authoring). A software product having the brand name of VideoShop announced by DiVA Corporation and introduced in MACLIFE No. 45, May 1992, pp. 242–245 also provides a function for selecting scenes and arranging them in a desired sequence. On its editing screen, a new sequence of scenes into which the original sequence of scenes has been rearranged is displayed along with a time axis. However, these techniques are intended to enable the user to select and rearrange scenes in order to create a motion image that is different from the original one; they are not directed to making the scene information input efficient.

Correct splitting of an original motion image into cut scenes and provision of information necessary for individual scenes are essential for efficient editing of the motion image later on, but no related art has been directed to solving the above problems at the stage of scene information input.

OBJECTS OF THE INVENTION

It is an object of the present invention to facilitate the construction of a motion video data base.

It is another object of the present invention to solve the above problems and to provide a user-friendly interface for scene information input.

It is a further object of the present invention to allow the user to efficiently verify and correct the automatically detected scene change points.

It is yet another object of the present invention to make it easy for the user to construct a motion image database for storing the semantic contents of individual scenes and information on the correlations between them.

DISCLOSURE OF THE INVENTION

A scene information editor extracts, for a plurality of scenes, still image data on the representative frames of scenes from a representative frame file, and arranges the still images along with a time axis and in chronological order along a time axis for display on the screen of a display. For the time period corresponding to the part of the time axis specified by a user, the editor extracts motion image data from an LD and displays the motion image data on a TV monitor. The scene information editor also extracts the information given to those scenes from a scene information file and graphically displays the information on the screen of the display at the same time. When the user inputs an edit command, the scene information editor executes it for the edit scene information file.

BRIEF DESCRIPTION OF THE DRAWINGS

FIG. 9 is a diagram showing an example of the scene change information file;

FIG. 20 is a diagram showing the scene hierarchy tree corresponding to FIG. 19.

FIG. 21 is a diagram showing the states before and after a change in the hierarchy tree in FIG. 20;

DESCRIPTION OF THE PREFERRED EMBODIMENT

Figure 4:
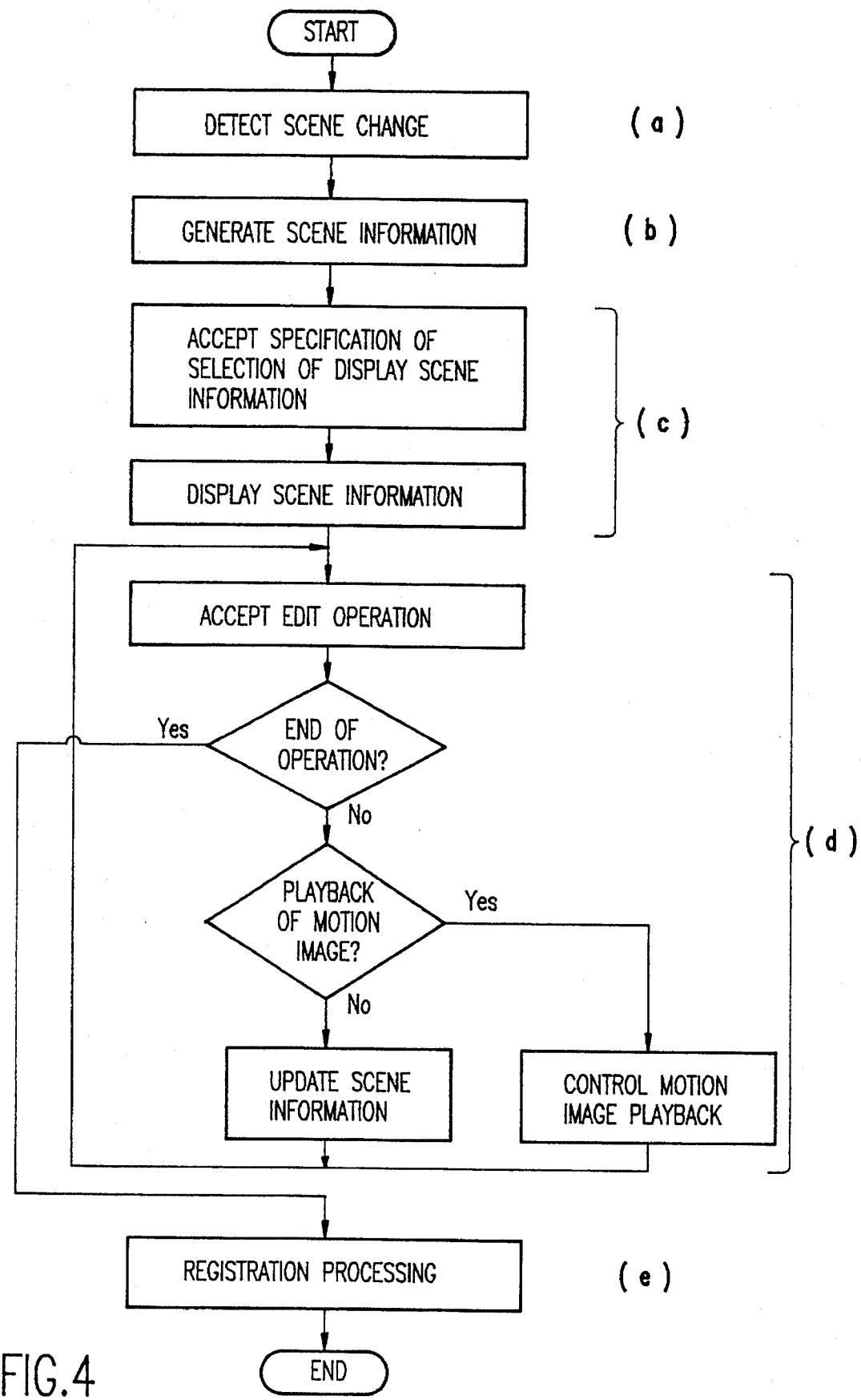
FIG. 4 is a flowchart showing the procedure for scene information input according to the present invention.

FIG. 4 shows the flow of a process from splitting a motion image consisting of chronologically ordered frame sequences into scenes that are partial frame sequences of the whole motion image, through inputting scene information after verification and correction of the splitted scenes, up to registering the input information in a motion image database. The invention included in this application includes (a) a step for detecting scene change points, (b) a step for generating scene information on the basis of the detected scene change points and storing it in a scene information file, (c) a step for graphically displaying scene information on a display, (d) a step for executing the edit command specified by the user operating the input means to edit the scene information file, and (e) a step for registering the scene information contained in the scene information file in the database means.

In the above step (a), scene change information including the positions in the motion image of the detected scene change points as well as the probability of each change is generated. Preferably, the probability of scene change is calculated by a method depending on the type of scene change, and information on the scene change type is included in the scene change information.

The above step (b) includes a step for creating a representative frame file in which still image data on representative frames are stored for scenes defined by logically splitting the motion image according to the scene change information; a step for creating a scene information file that contains the starting and ending frame numbers of scenes; the type and probability of each scene change; the representative frame numbers; and the addresses at which the data on representative frames are stored.

Figure 5:
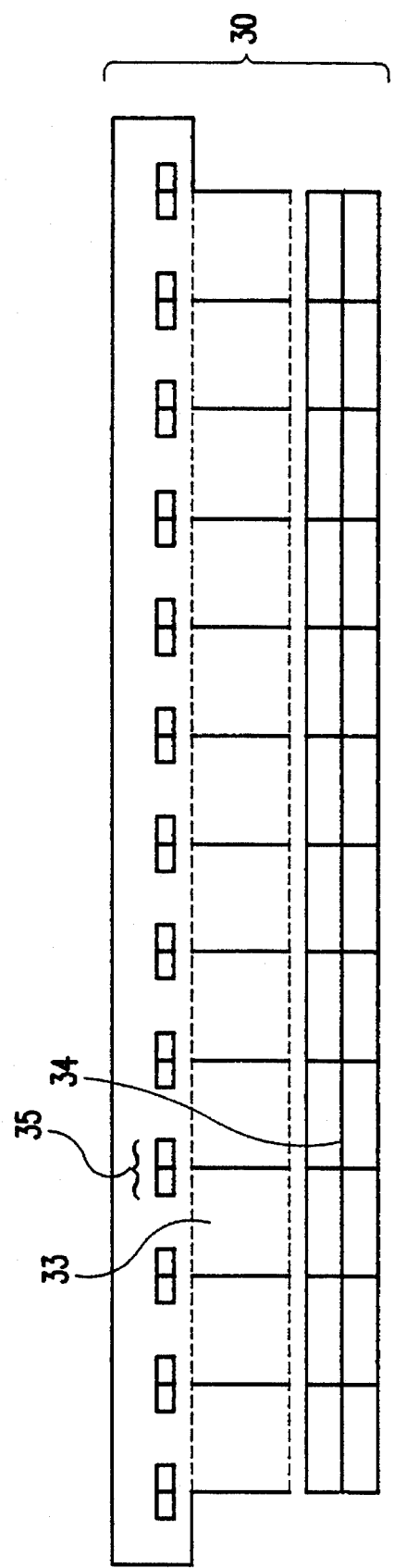
FIG. 5 is a diagram showing an example of the scene chart.
Figure 6:
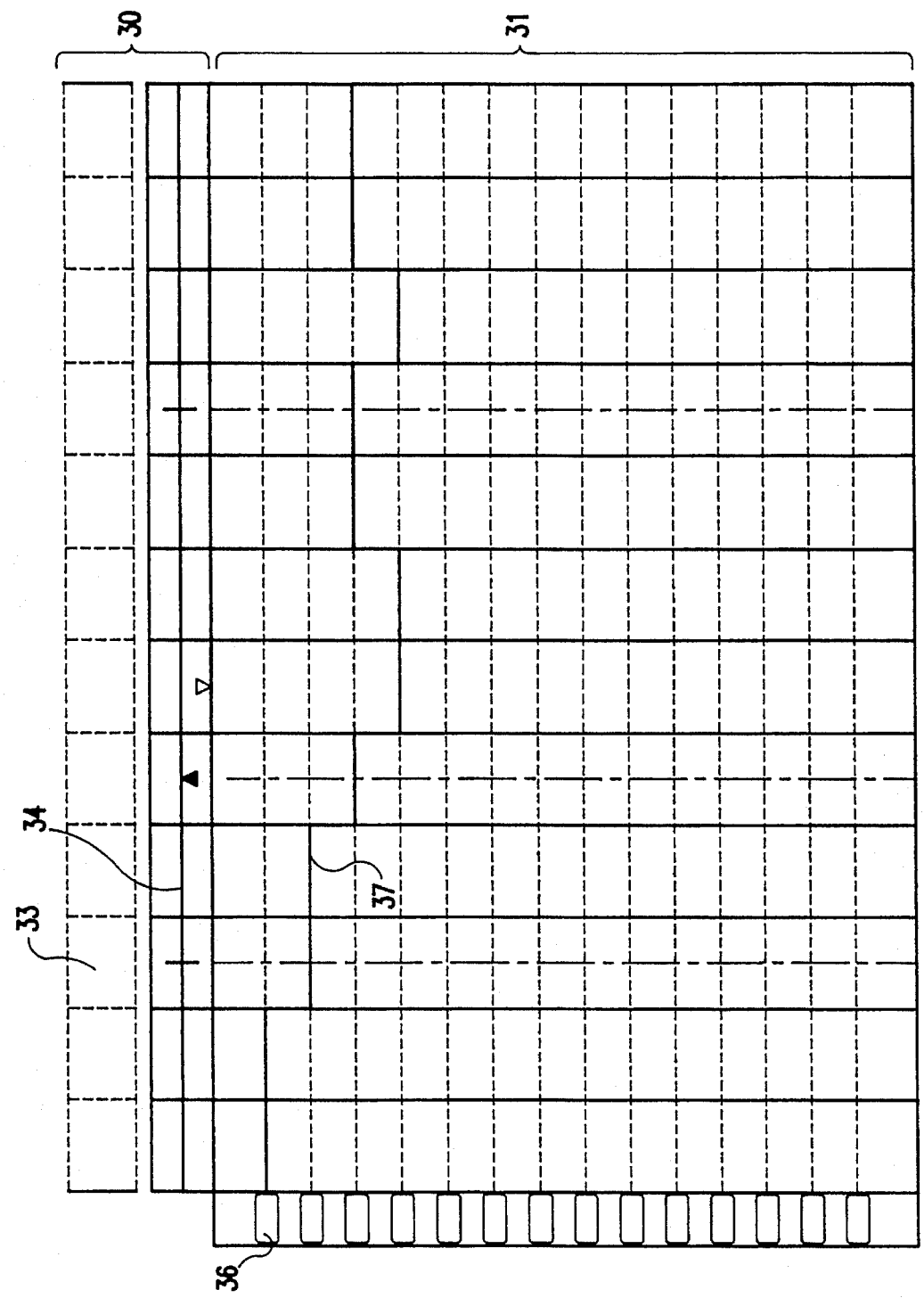
FIG. 6 is a diagram showing an example of the scene hierarchy chart.
Figure 7:
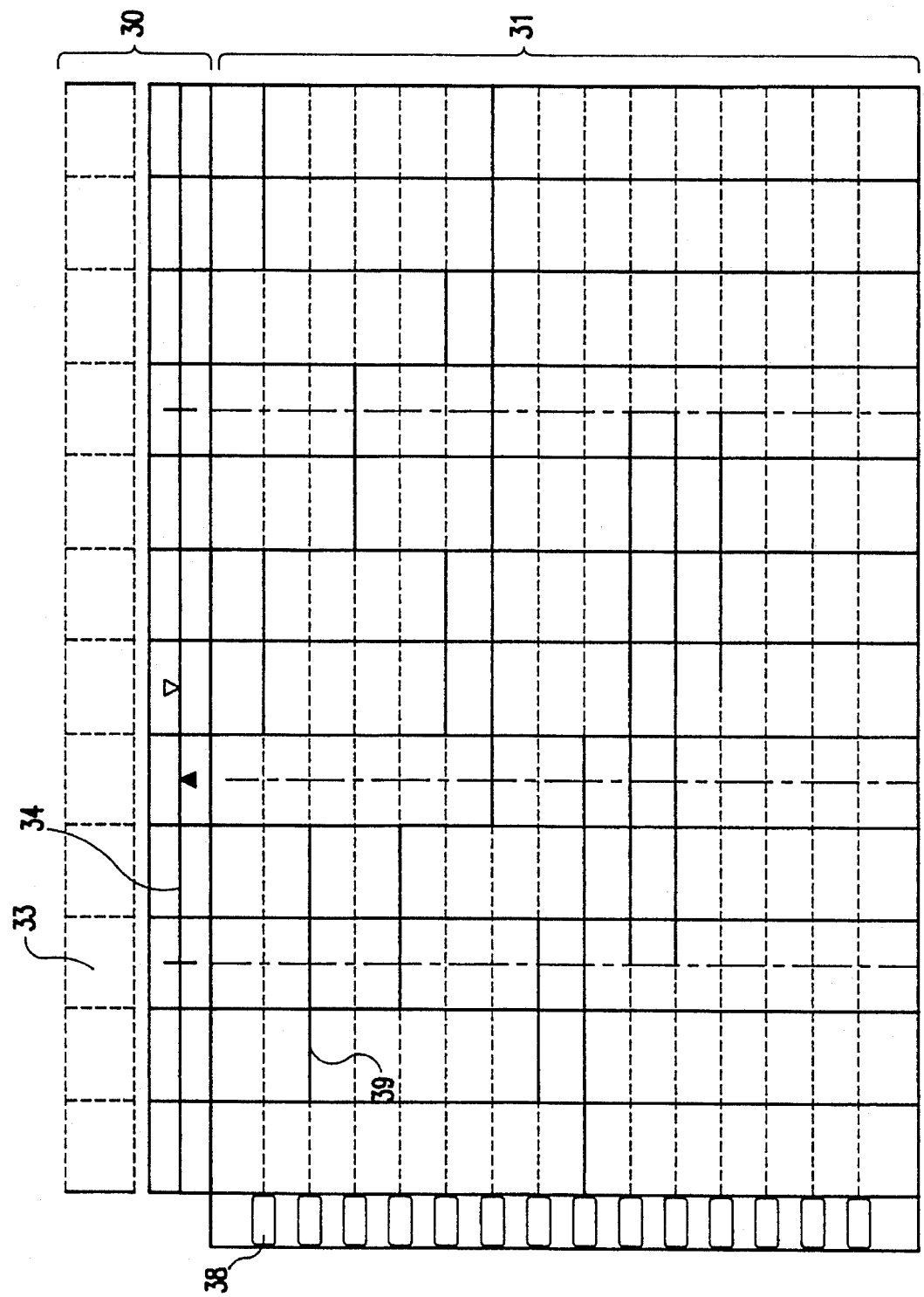
FIG. 7 is a diagram showing an example of the scene keyword chart.

In the above step (c), one or more charts graphically presenting scene information are displayed. The possible types of charts are the scene chart 30, scene hierarchy chart 31, and scene keyword chart 32, examples of which are shown in FIGS. 5 to 7. The type of chart to be displayed is selected by the user.

The scene chart 30 exemplified in FIG. 5 displays the shrunken images 33 of representative frames selected for individual scenes, the shrunken images 33 being arranged in time sequence along the time bar 34, which is an object representing a time axis. This chart has a region 35 that displays the type and probability of a scene change, at a scene change point, or the leading frame of a scene.

The scene hierarchy chart 31 exemplified in FIG. 6 is displayed simultaneously with the scene chart 30, and represents the hierarchy depth of scenes according to their distance from the time bar 34. Specifically, boxes 36 are arranged in a direction perpendicular to the time bar 34, and the order of the boxes is made to correspond to the hierarchy depth. An object representing information on the hierarchy of a scene is displayed in an area 37 whose position is defined by the interval corresponding to the particular scene on the time bar 34 and the box 36.

In the scene keyword chart 32 exemplified in FIG. 7, the boxes 38 are arranged in a direction perpendicular to the time bar 34 of the scene chart 30, and if a keyword is assigned to a scene, an object representing its information is displayed in the area 39, whose position is defined by the interval corresponding to the particular scene and the box 38 of the particular keyword. Preferably, the keyword is associated with a still image such as an icon symbolizing its contents, and is displayed by using the still image. Alternatively, by associating a still image with the identifier of a keyword, the still image itself is treated in the same manner as the keyword. In this specification, the keyword is a concept that includes both the identifier and the still image.

In the above step (d), an edit command is accepted. This edit command is specified by the user through direct manipulation such as pointing to, moving, and copying an object displayed on the screen in the above step (c). This step includes a sub-step of responding to the specification of the shrunken image 33 of the representative frame by the user in each of the above charts to play back the scene corresponding to the particular representative frame, and if an interval on the time bar 34 is specified, playing back the motion image corresponding to the specified interval.

If the scene chart is selected in the above step (c), a command for adding or deleting a scene change point is accepted in one mode, a command for changing a representative frame is accepted in a second mode, and a command for updating scene attribute information is accepted in a third mode. In this way the scene information file is edited, and sometimes the representative frame is also edited. If the scene hierarchy chart is selected, commands for splitting and merging scenes and a command for changing the hierarchy depth are accepted, and as a result the scene information file is edited. Further, if the scene keyword chart is selected, commands for setting and canceling a keyword allocation to a scene are accepted and used to edit the scene information file.

Alternatively, if both the scene hierarchy chart and the scene keyword chart are selected at the same time in the above step (c), both charts are simultaneously displayed. In the first mode, in this case, in response to manipulation of an object on one chart, the scene information corresponding to that chart is updated. In the second mode, in response to manipulation of an object on one chart, the scene information corresponding to the other chart is updated. In the third mode, in response to manipulation of an object on one chart, the sets of scene information corresponding to all the charts are simultaneously updated.

When the above step (d) is repeated and the end of the input operation is specified, in the above step (e), a command for registering the scene information file and, when appropriate, a command for registering the file of representative frame images are generated and sent to the database means.

Figure 8:
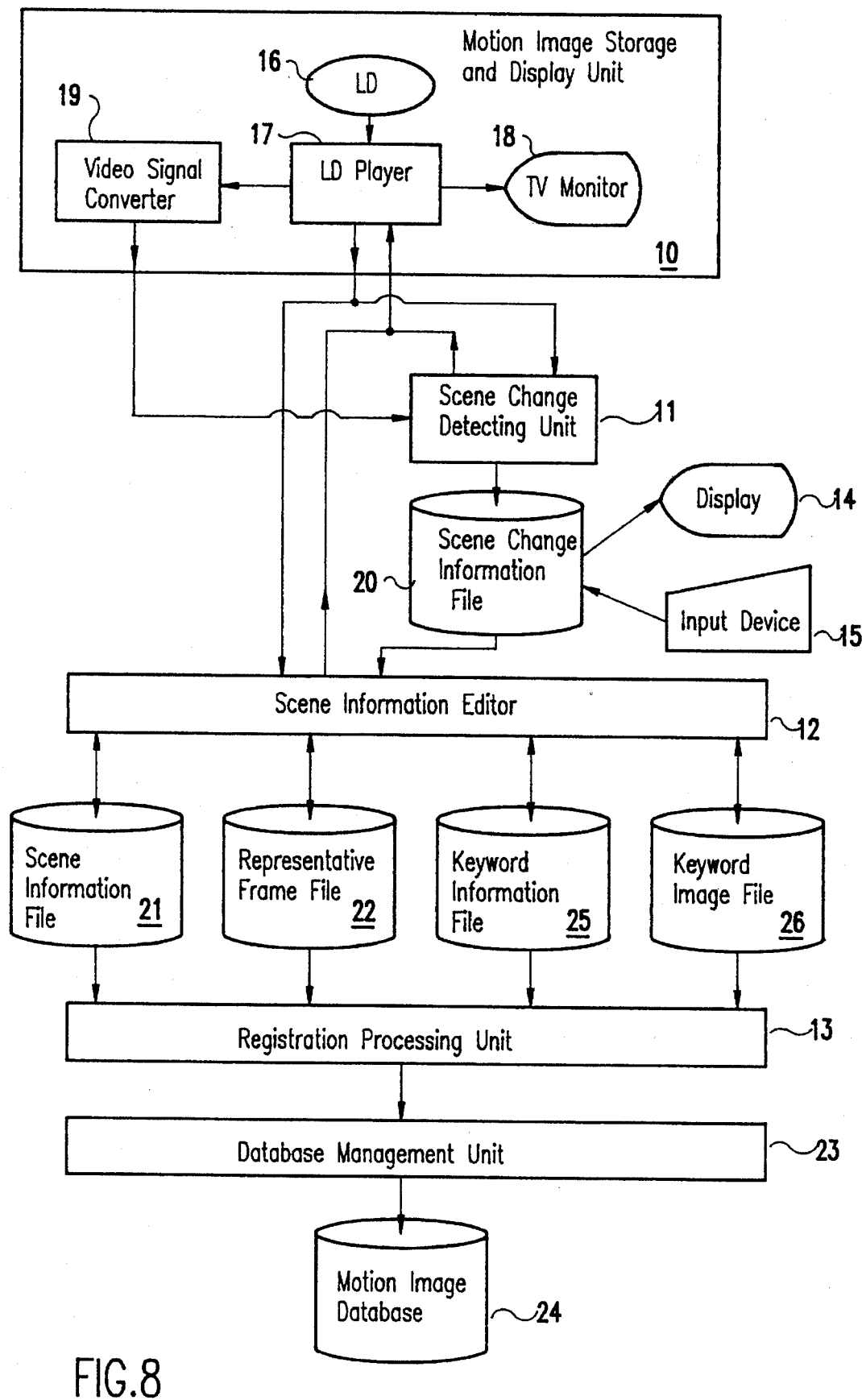
FIG. 8 is a block diagram showing the scene information input system according to the present invention.

FIG. 8 shows an example of the configuration of a scene information input system in which the present invention is incorporated. The system consists of a motion image storage and display unit 10, a scene change detection unit 11, a scene information editor 12, a registration processing unit 13, a display 14, and an input device 15.

The motion image storage and display unit 10 includes a laser disk (LD) 16 on which a motion image is stored as an analogue image, a laser disk player (LD player) 17, a TV monitor 18, and a video signal converter 19. The LD player 17 has an interface that responds to an external control signal from the scene information editor 12 or the like to send the analogue image in the LD 16 to the TV monitor 18 or video signal converter 19. The LD player 17 also includes an interface that responds to an external control signal by returning data such as the number of the frame that is currently being played back. The analogue image is input from the LD player 17 to the video signal converter 19, which converts analogue signals into digital ones to output a digital image.

The scene change detection unit 11 outputs a control signal to the LD player 17 to sequentially capture the image data of consecutive frames, detect scene change points, and calculate scene change probabilities. As a result of detection, a scene information file 20 is created in which are recorded the number of each frame in which a scene change has occurred, the type and probability of the change, and the number of the frame representative of the scene (for instance, the leading frame). FIG. 9 shows an example of a scene change information file 20, in which a change frame number 901, a representative frame number 902, a change probability 903, and a change type 904 are stored as one record. Of the values in the field 904, "1" represents "normal" and "2" represents "dissolve." What they mean is described later, along with the details of the scene change detection processing.

The scene information editor 12 consists of a scene editor module, a scene hierarchy editor module, a scene keyword editor module, and a cross editor module. Every module displays scene information stored in a scene information file 21 and representative frame file 22 on the display 14, and responds to a user's specification through the input means 15 to update the scene information file 21 and representative frame file 22. In particular, the scene editor inputs the scene change information file 20 to create a scene information file 21 and representative frame file 22.

Figure 3A:
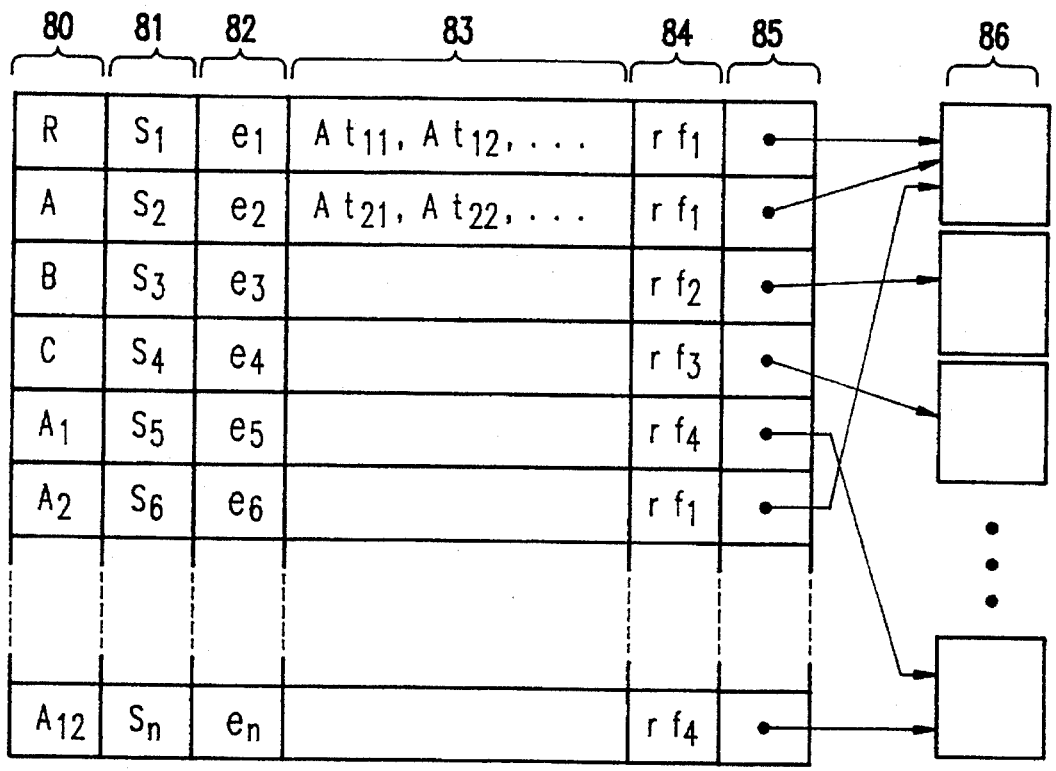
FIG. 3 is a diagram showing examples of a scene information file and a representative file.
Figure 3B:
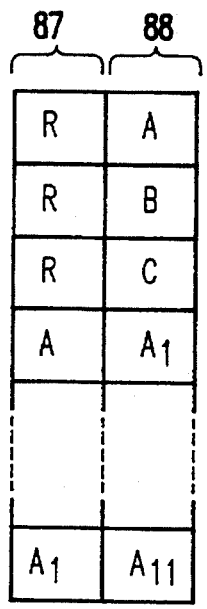
Figure 10:
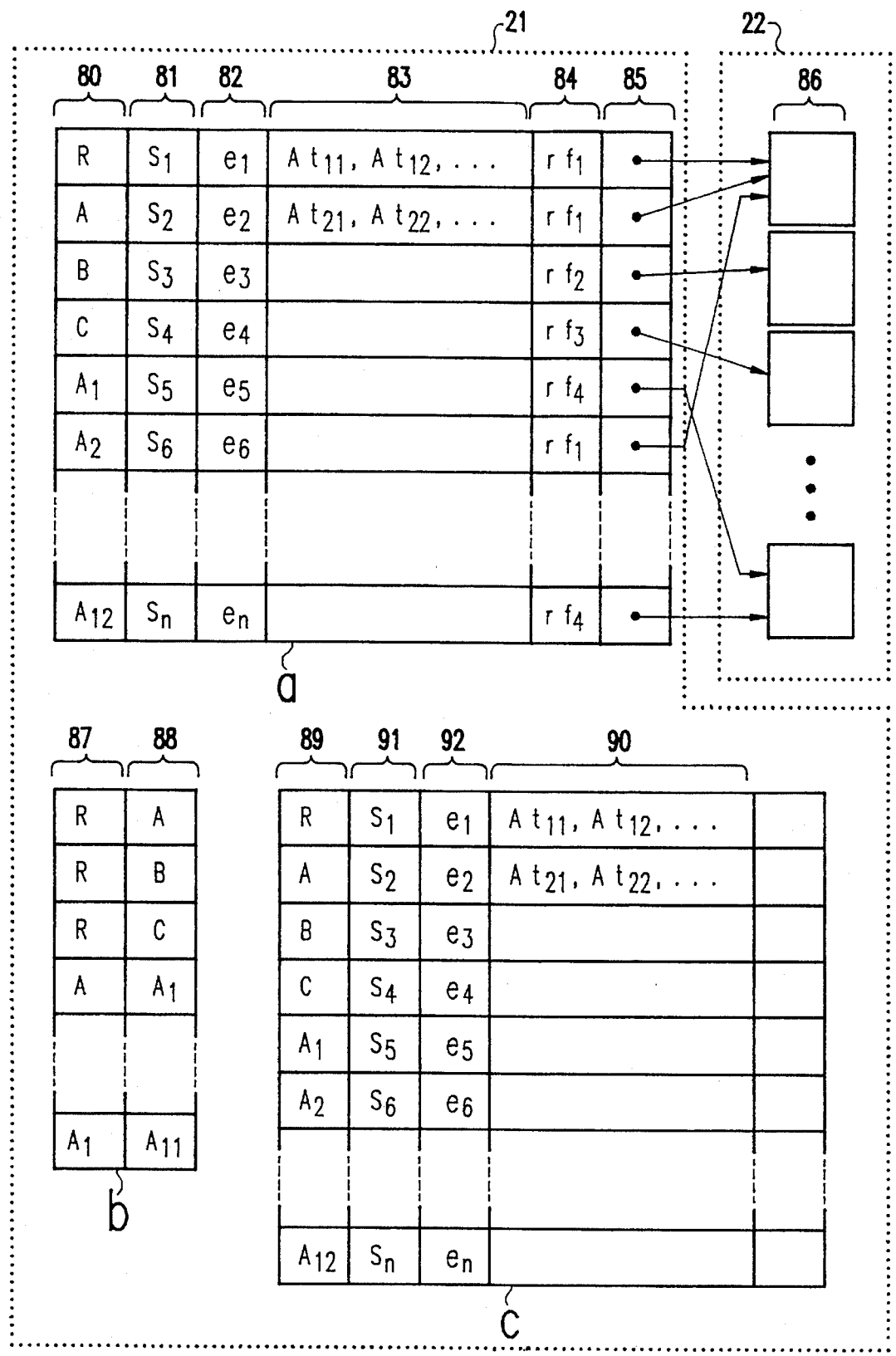
FIG. 10 is a diagram showing the scene information file and representative file of the embodiment.

FIG. 10 shows the structures of the scene information file 21 and representative frame file 22. The scene information file 21 consists of files (a), (b), and (c), but files (a) and (b) are same as those shown in FIG. 3. Accordingly, the same elements are referred to by the same numerals, and description of files (a) and (b) is omitted. In this embodiment, because of the construction of a motion image database in which scene retrieval is performed by means of keywords such as the names of characters or the types of background, an identifier 89, starting frame number 91, ending frame number 92 and keyword 90 assigned thereto are stored as one record in the third file (c) for each scene. Examples of such motion image databases are disclosed in Oomoto, E. and Tanaka, K., "A Video Object Model and Its Application to a Video Database System," IEICE Tech. Rep. Vol. 89, No. 466, 1990, pp. 33–40 and patent application No. 4-65620 (U.S. Pat. No. 5,428,774 to Hashihara et al.). The modules of the scene information editor 12 identify a record by means of the scene identifiers 80, 87, 88, and 89 of files (a), (b), and (c), and refer to and update scene information. Although it is not shown, file (a) may include scene change type and probability fields. The representative frame file 22 is a collection of still image files 86 created for individual scenes.

In response to instructions issued by the user through the input device 15, the scene information editor 12 issues control signals to specify pauses in the playback of an image and frame number acquisition. In response thereto, the LD player 17 stops the playback of the image and displays the current still frame on the TV monitor 18 while supplying the number of the still frame to the scene information editor 12. The input device 15 is typically a character and numeric value input device such as a keyboard, mouse, or touch panel.

The registration processing unit 13 generates a command for storing the scene information file 21 and, when appropriate, a command for storing the representative frame file 22 in the database 24, and sends them to the database management unit 23.

A keyword information file 25 and keyword image file 26 are also shown in FIG. 8, and these files are explained later along with the scene keyword editor.

In the above configuration, the scene change detection unit 11, scene information editor 12, registration processing unit 13, and database management unit 23 are implemented by programs for accomplishing those functions and a computer for executing the programs. In general, these programs are stored in a medium such as a magnetic disk, optical disk, or magnetic tape.

The scene change information file 20, scene information file 21, representative frame file 22, keyword information file 25, and keyword image file 26 are usually stored in the main memory or an external storage device of a computer. As shown in FIG. 10, these files may be a collection of sub-files.

In the above description, the motion image storage and display unit 10 can be replaced by a digital motion image database system as disclosed in PUPA No. 1-224875 (Japanese Published Unexamined Patent Application). In this case, since no analog/digital conversion is required and a motion image can be shown on a display, the video signal converter 19 and TV monitor 18 can be eliminated. In the digital motion image database system, a database management program and a computer for executing it are used instead of the LD player 17.

The scene change detection unit 11 is now described in detail. This unit calculates, by a method depending on the type of change, the degree of change for each frame in order to detect scene change points of different types. The degree of change is the change in the pixel value from the preceding frame.

The most representative examples of scene change types are "normal" and "dissolve," and a method for detecting them is described below. Here, "normal" means that the camera angle completely changes from one frame to the next, or that a scene changes on account of the passage of time between events in a motion image. "Dissolve" is a scene change caused by simultaneous occurrence of fade-in and fade-out. A normal scene change ends immediately, whereas a dissolving scene change requires several dozen frames.

The details of an example of a process for detecting the "normal" type of scene change are disclosed in the references given in the description of the related art. In brief, for each frame, the frame difference mean FDM(j), which is the absolute differences in pixel value between the current frame (j) and the preceding frame (j−1) is, first calculated, and then the difference DFDM(j) between the mean value FDM(j−1), which is the difference between the frame before last (j−2) and the preceding frame (j−1), and the previously calculated mean value FDM(j) of the difference is calculated. Subsequently, a check is made to determine whether a zero cross has occurred between the calculated DFDM(j) and the last DFDM(j−1). If a zero cross has occurred, the absolute value of the difference between DFDM(j) and DFDM(j−1) is compared with a preset threshold. If the difference is larger than the threshold, frame number j is recorded in the scene change information file 20 as the change frame number 901 (FIG. 9), and it is deemed that a normal type of scene change has occurred. A value representing "normal" is set in the field 904. As the representative frame number 902, the value resulting from the addition of a predetermined value to the change frame number 901 is recorded in the scene change information file 20.

Figure 11:
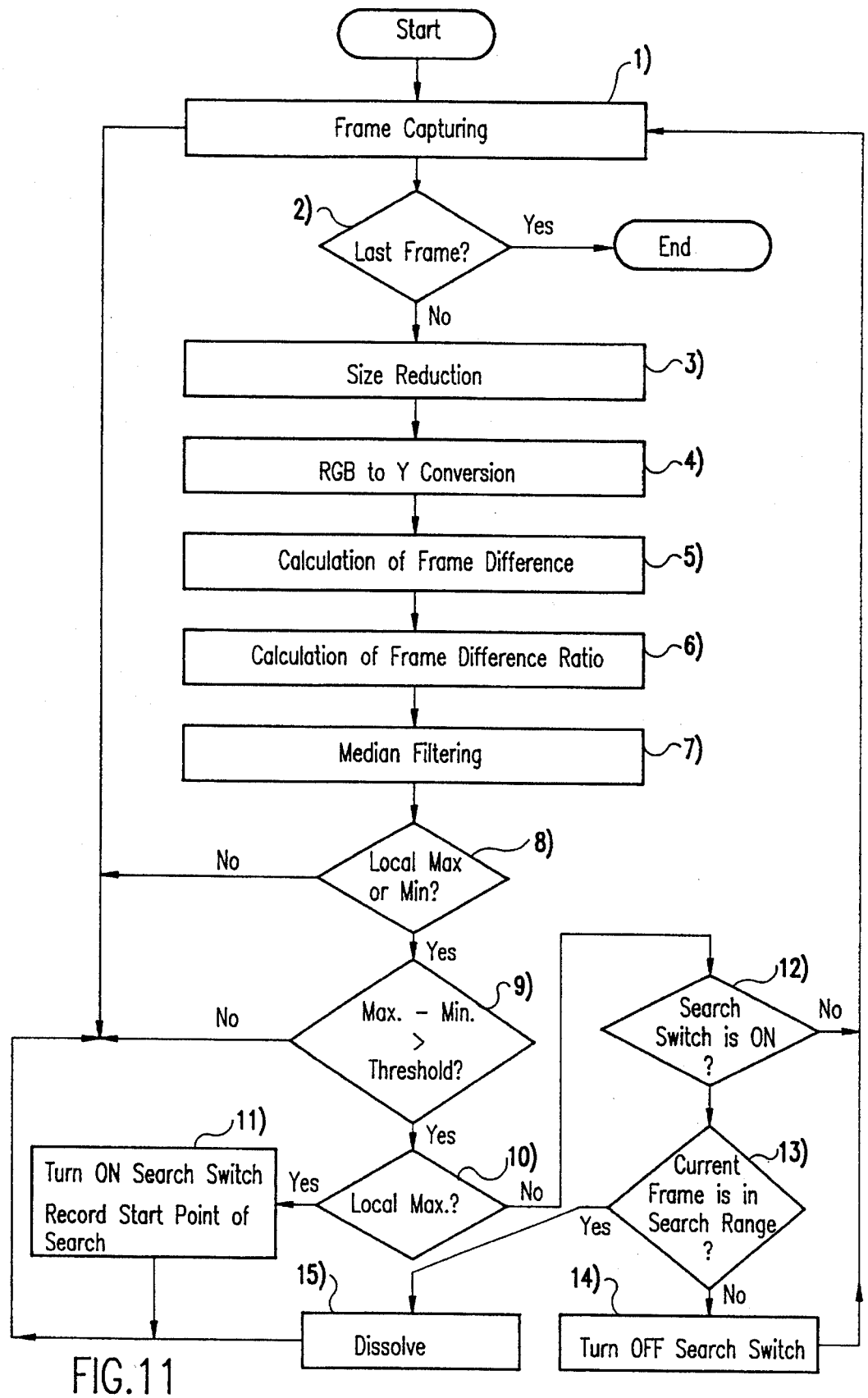
FIG. 11 is a flowchart showing the flow of a process for detecting scene change points of the "dissolve" type.

Now, the flow of the detection processing for "dissolve" is described with reference to FIG. 11.

1) The image of one frame is captured from the video signal converter 19.

2) If there is no frame any more, the processing is terminated.

3) The captured image is shrunk. That is, the image is sub-sampled.

4) If the captured image is in color, it is converted into a gray image. If the image has been captured in the form of intensity information such as an NTSC signal, this step is unnecessary.

5) The difference between the current frame and the preceding frame is calculated for each sub-sampled pixel.

The above steps are common to the detection of the "normal" type of scene change points described above.

6) The frame difference calculated at this time is divided by the previously calculated frame difference at each sub-sampled pixel. Further, the ratio of all the sub-sampled pixels whose calculated ratio show positive values is calculated.

7) The series of the calculated ratio is filtered by the Median filter.

8) Whether the current frame is located at local maximum or minimum in the series of the filtered ratio is checked. If it is local maximum, the ratio is recorded as Lmax, and if local minimum, as Lmin. If the current frame is neither maximum nor minimum, the process returns to (1).

9) If it is local maximum/minimum, the difference between local maximum/minimum and previously detected local minimum/maximum is calculated. If the difference is greater than a preset threshold, the process advances to (10). If it is smaller than the threshold, the process returns to (1).

10) If the current frame is local maximum, the process advances to (11). If minimum, the process skips to (12).

11) Since the current frame may be the starting point of dissolve, a value representing ON is set for a variable search switch, and the number of the current frame (assumed to be ST) is recorded.

12) If the variable search switch is ON, the current frame may be the ending point of "dissolve," and thus the process moves to (13). If the switch is not ON, the process returns to (1).

13) If the difference between the number of the current frame (assumed to be CT) and the number (ST) of the frame at which the search was started is within the search range, dissolve has happened. If the difference is outside the search range, dissolve has not happened. The search range is provided as a parameter at the starting point of the whole process for detecting scene changes. Usually, it is a value corresponding to a time of about three seconds.

14) Since the type of change is not "dissolve," a value representing OFF is set for the variable search switch and the process returns to (1).

15) Since the type of change is "dissolve," a frame representing minimum is recorded as the ending point of the dissolve and the process returns to (1).

The frame number ST is recorded in the change information file 20 as the change frame number 901. A value representing "dissolve" is set in the field 904. The value resulting from adding a predetermined value to the change frame number 901 is recorded in the scene change information file 20 as the representative frame number 902. The value obtained by normalizing the difference of the maximum and minimum calculated in step (9) for the starting frame of the dissolve is used as the scene change degree C.

The process for calculating the probability of a scene change is now described. This process is commonly applied irrespective of the type of scene change. First, the upper limit CH and the lower limit CL of the change degree for which detection failure or erroneous detection may occur are previously input. The probability P is given by P=(C−CL)/(CH−CL) if the value C falls within the range of CL and CH, by P=1 if C is above this range, by P=0 if C is below this range. The value of P thus obtained is recorded in the field 903 of the scene change information file 20.

The scene information editor 12 is the main portion of the present invention. The method of displaying scene information is first described below, and then the input operation procedure and the operations of all the editors are described.

Figure 12:
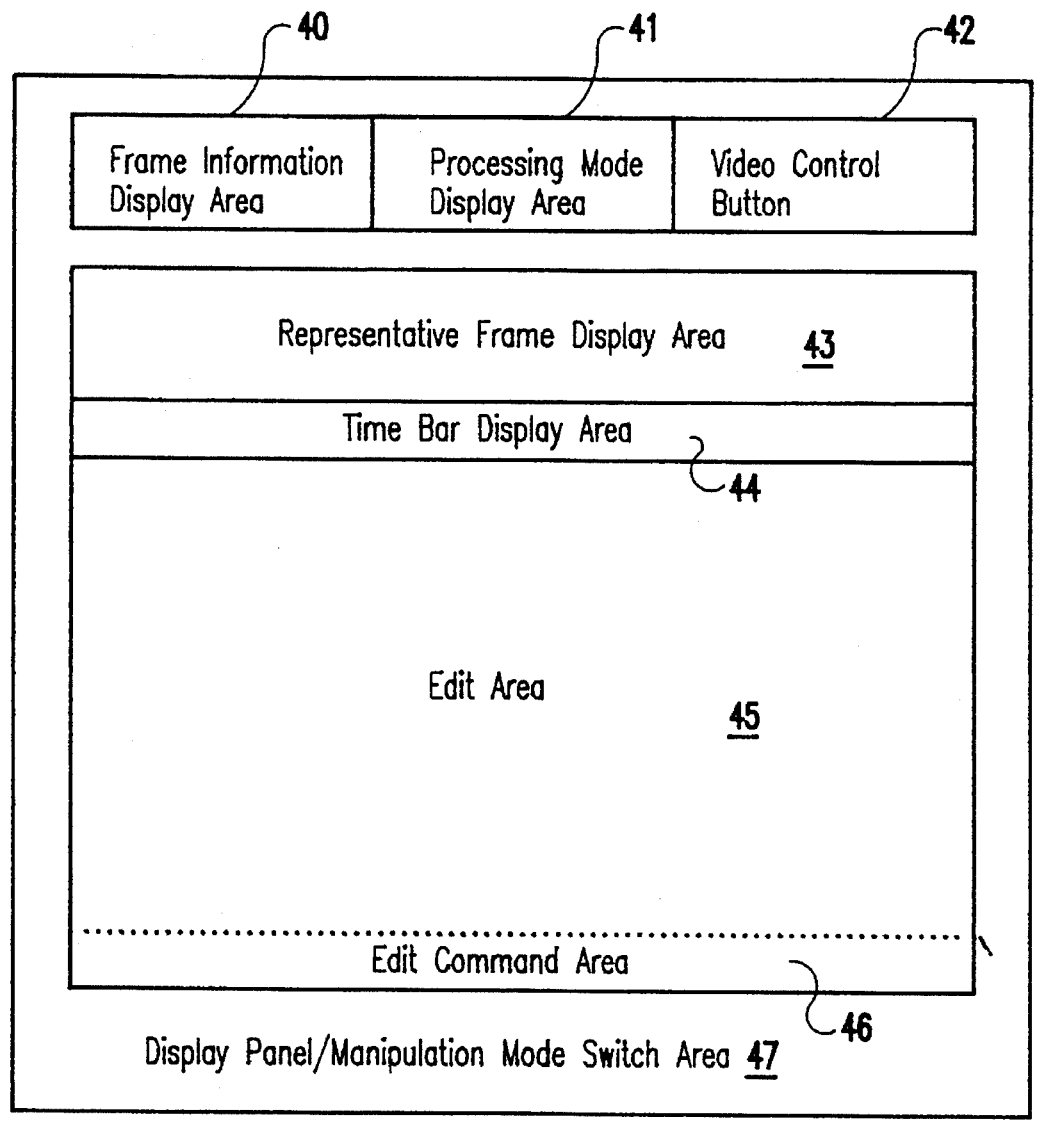
FIG. 12 is a diagram illustrating the basic construction of the display panel of the scene information editor.

As shown in FIG. 12, the scene information editor 12 places on the screen of the display 14 a frame information display area 40, a processing mode display area 41, a video control button 42, a representative frame display area 43, a time bar display area 44, an edit area 45, and edit command area 46, and a display panel/manipulation mode switch area 47. The scene chart 30 shown in FIGS. 5 to 7 consists of the representative frame display area 43 and the time bar display area 44. In addition, the scene hierarchy chart 31 and scene keyword chart 32 are displayed in the edit area 45.

Figure 13:
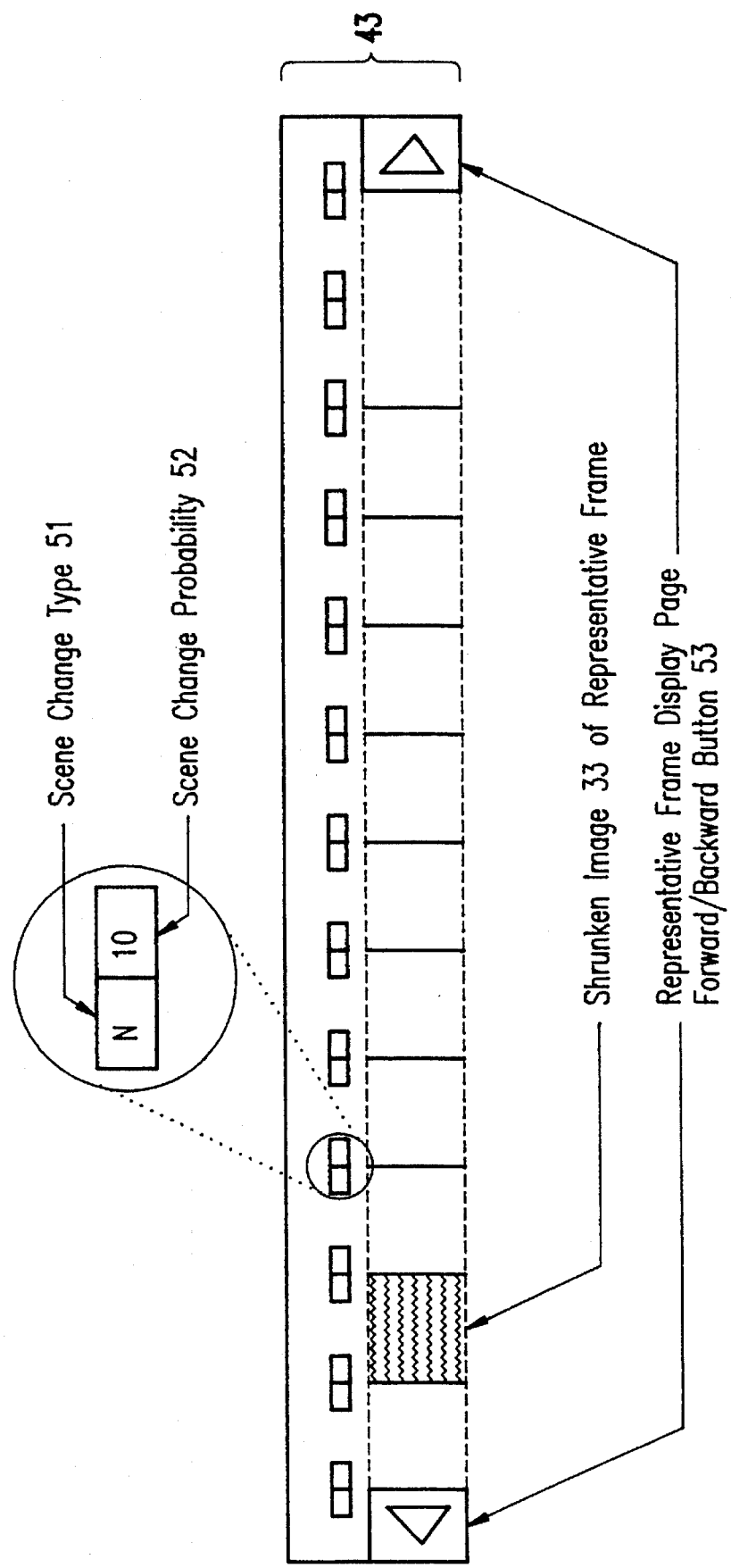
FIG. 13 is a diagram showing an example of a representative frame display area in the scene information editor display panel.

The representative frame display area 43 is an area in which, for a plurality of scenes, as exemplified in FIG. 13, the shrunken images 33 of the representative frames are shown, and the scene change type 51 and probability 52 are displayed for each scene change point. Finally, the representative frame display page forward/backward button 53 is an area in which the scrolling of representative frames is specified.

Since one scene has one representative frame if scene information is edited for cut scenes, the shrunken images 33 are placed in such a way that there is one for each scene. FIG. 13 shows an example of such placement. However, at higher levels in a hierarchy tree, one scene may have a plurality of representative frames. In this case, all of the shrunken images 33 of the particular scene may be shown in a time sequence. Alternatively, if the earliest representative frame, for instance, is automatically selected, the external appearance of the representative frame display area 43 is as shown in FIG. 13, even for higher level scenes.

Figure 14:
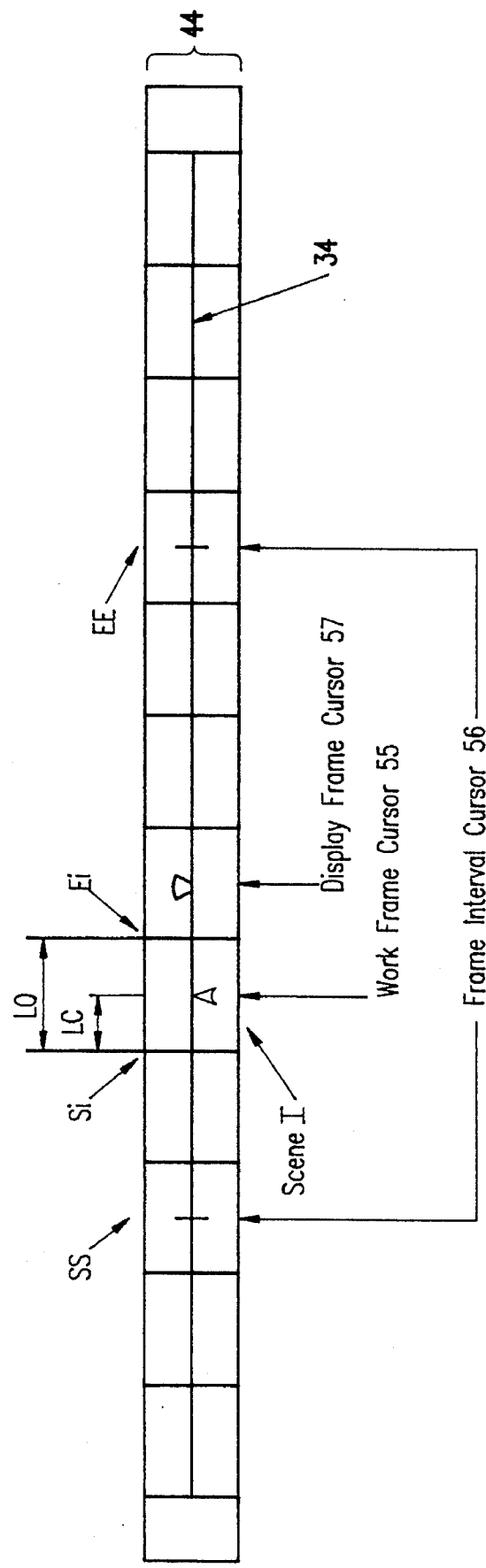
FIG. 14 is a diagram showing an example of the time bar display area in the scene information editor display panel.

The time bar display area 44 is an area in which, as shown in FIG. 14, the cursors 55, 56, and 57 are displayed on the time bar 34 representing a time axis. The work frame cursor 55 designates a frame, and the frame interval cursor 56 designates the starting and ending positions of a frame interval. The cursors 55 and 56 allow the user to set a frame or frame interval as an object to be manipulated in the step (d) described in "Means for solving the problems." These cursors are moved interactively by the user operating input means 15 by, for instance, dragging a mouse cursor (not shown). By clicking the time bar 34 with the mouse cursor, the state in which the cursors 55 and 56 are displayed and the state in which they are not displayed can be switched. The display frame cursor 57 indicates the current frame position of the motion image being displayed on the TV monitor 18.

In FIG. 14, an interval of an equal length (LO) is assigned to every scene. The number of frames corresponding to the length LO depends on the scene. The positions of the cursors 55, 56, and 57 and the numbers of the frames designated by them are correlated as follows. That is, taking scene I in FIG. 14 as an example, the frame number F designated by the cursor 55 is calculated by the following expression, if it is supposed that the distance between the starting point of the scene and the point designated by the cursor 55 on the time bar 34 is LC and the starting and ending frame numbers of scene I are Si and Ei, respectively.

$$F=Si+LC*(Ei-Si)/LO$$

The starting and ending frame numbers of the frame interval designated by cursor 56 are calculated in a similar manner. In addition, the position at which cursor 57 is displayed is obtained by converting the number (F) of a frame that is being played back into a position (LC) on the time bar 34.

In all the editors and modes described below, in response to specification of the shrunken image 33 of a representative frame by the user operating the input device 15, or setting of a frame interval in the time bar display 44 with subsequent operation of the video control button 42, the motion image of a specified time period is played back. For instance, in FIG. 14, if the shrunken image 33 of scene I is clicked, the part of the motion image from frame Si to frame Ei is displayed on the TV monitor 18. In addition, when specified by the frame interval cursor 56, the part of the motion image from frame SS to frame EE is displayed on the TV monitor 18. Alternatively, a window may be provided in part of the scene information display panel for displaying the motion image, or a scene may be played back in area occupied by the corresponding shrunken image 33.

In FIG. 12, the frame information display area 40 shows information on a frame to be manipulated, such as the position of the said frame in the whole original motion image. The display panel/manipulation mode switch area 47 has areas for specifying display panel switching and selection of the processing mode in each panel (including a mode switch button 58 and an editor switch button 59 shown in FIG. 15), and an area for specifying the start-up of the registration processing unit 23 (the registration button 68 in FIG. 15). The edit mode selected there is displayed in the processing mode display area 41, while the edit commands that can be selected in the current processing mode are displayed as a menu in the edit command area 46. The video control button 42 is an area for instructing the scene information editor 12 to send a control signal for image playback to the motion image storage and display unit 10. In edit area 45, the scene information editor 12 displays scene information in the form of a scene chart, scene hierarchy chart, or scene keyword chart. The user specifies an edit operation by specifying, moving, and copying of the object displayed in the chart, setting the cursor in the time bar, and selecting of an edit command, and the scene information editor 12 executes the specified command.

Now, the respective operations of the scene editor, scene hierarchy editor, scene keyword editor, and cross editor are described in detail.

(1) Scene Editor

The scene editor allows the user to verify a scene change point and correct any error made by the scene change point detection unit 11 while viewing the representative frame of a scene or the motion image corresponding to the scene, to edit the attribute information of the scene and to change the representative frame.

First, the scene editor reads the scene change information file 20, sends the frame number of the representative frame to the motion image storage and display unit 10, captures the image data of that frame from the motion image storage and display unit 10, and sub-samples pixels, thereby creating and adding the still image file 86 to the representative frame file 22. Then, it extracts the frame number in which a scene change has occurred from the scene change information file 20, and calculates the starting and ending frame numbers of the scene from the frame number to create a scene information file 21 as shown in FIG. 10.

Figure 15:
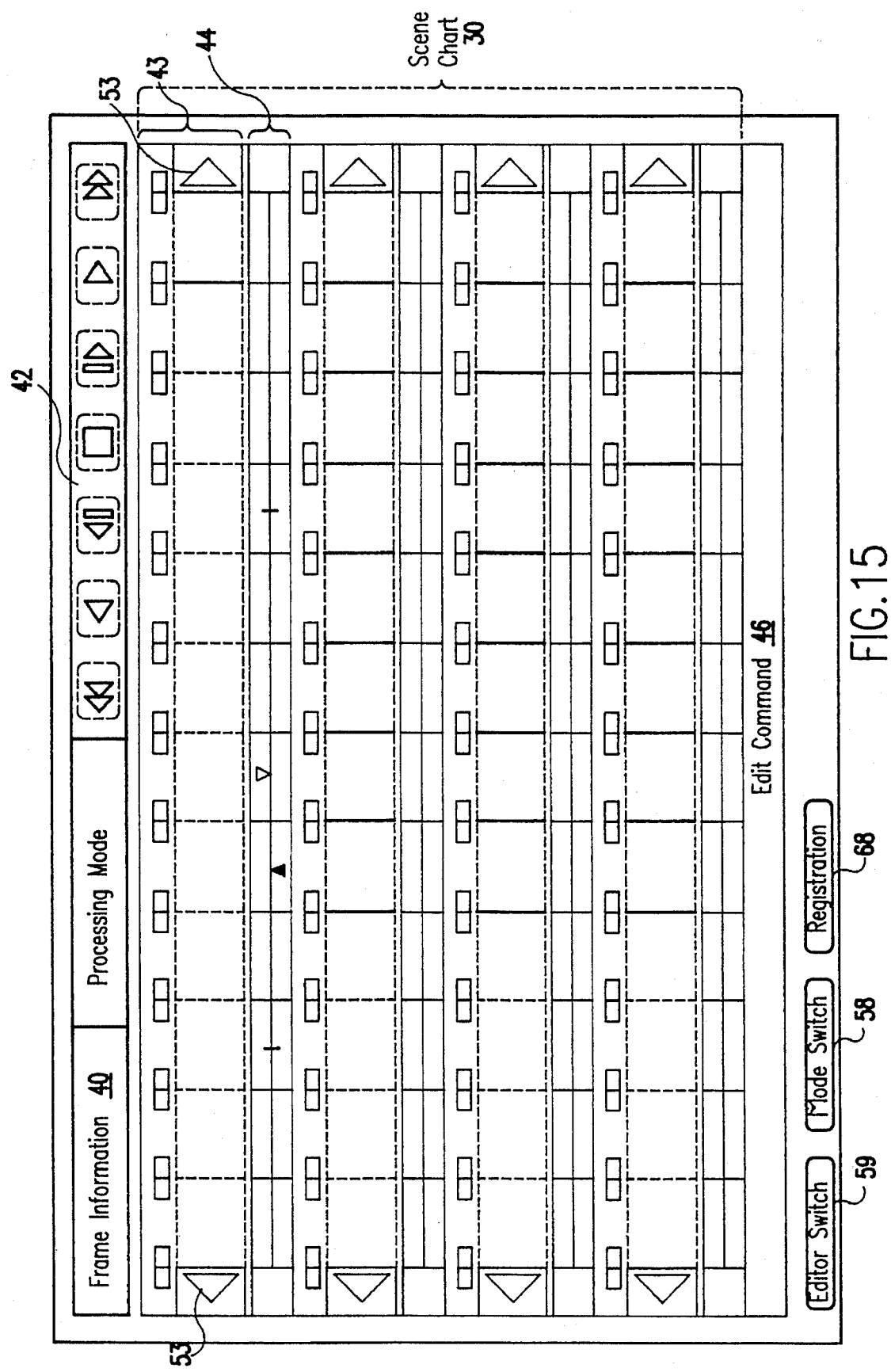
FIG. 15 is a diagram showing a panel display example in the scene verification and correction mode of the scene editor.
Figure 16:
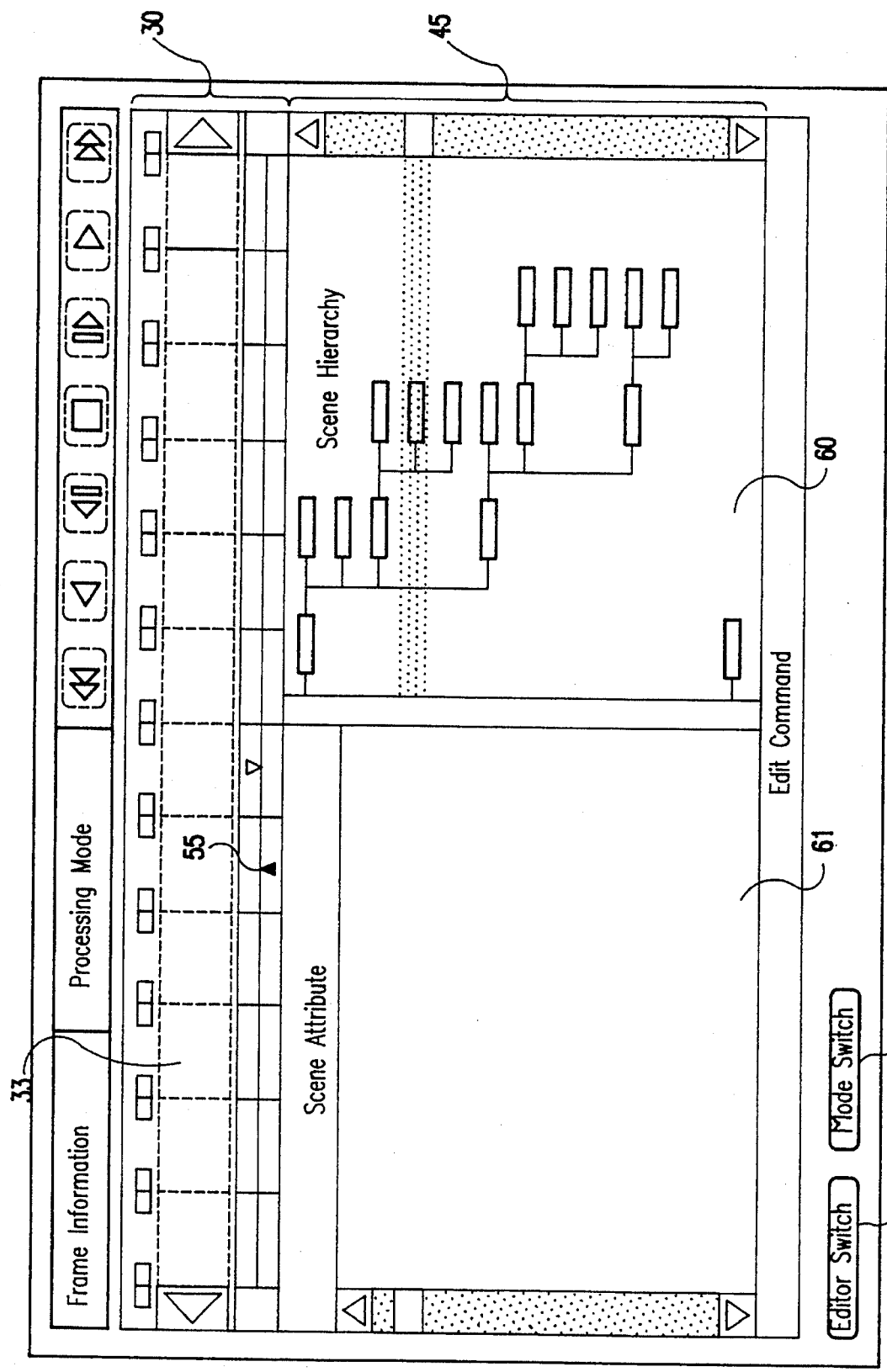
FIG. 16 is a diagram showing a panel display example in the scene attribute edit mode of the scene editor.
Figure 17:
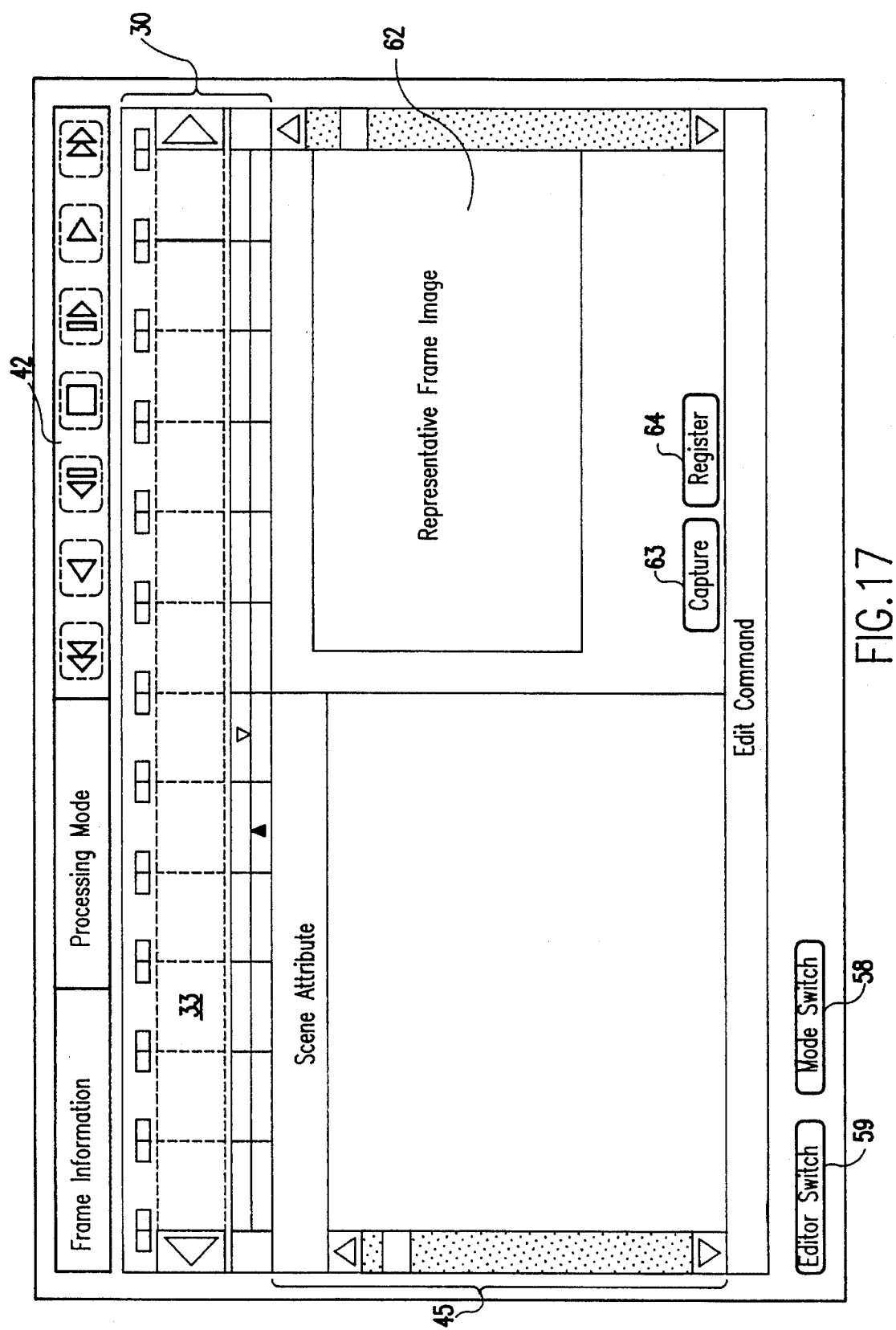
FIG. 17 is a diagram showing a panel display example in the representative frame change mode of the scene editor.

Then, the scene editor accesses the scene information file 21, as exemplified in FIGS. 15 to 17, and according to the data stored therein, presents scene information by using the scene chart 30. According to the user's specification, the scene editor displays either representative frames for all the scenes partitioned by the scene change detection unit 11 in chronological order, or only the scenes including scene change points whose probabilities are included in a previously specified range, including the preceding scene when appropriate. In the latter case, all the scenes meeting the condition are displayed either in chronological order or in the descending order of the possibility Q of detection error, according to the user's specification. The possibility Q of detection error is given, for instance, by |0.5−P|. P is the probability of a scene change point. Incidentally, a scene change type may be specified in lieu of probability as the condition for selecting a scene, or both may be specified at the same time.

The shrunken image 33 to be displayed is created by shrinking the image of the representative frame image 86. Because of the cost of using the storage device, and the quality and display speed of the image playback, the image size of one frame to be stored in the representative frame file 22 should preferably be between the original frame size and the size of the shrunken image 33.

It has already been stated that a representative frame page forward/backward button 53 is provided to cause display of a desired representative frame. In addition, in the panel shown in FIG. 15, when the endmost, lower-right-corner button 53 is clicked, the representative frames for one panel, in this example, for 48 scenes, are scrolled. Further, a command to allow the user to jump to any scene whose identifier is typed in the edit command area 46.

The scene editor operates in modes for verifying and correcting scene change points, for editing the scene attributes, and for changing representative frames. If the work frame cursor 55 is displayed, the panels exemplified in FIGS. 15 to 17 are displayed in response to the user's selection of the mode switch button 58 to change the mode by using a mouse cursor (not shown). If the work frame cursor 55 is not displayed, a target scene is specified by the user when the mode changes from scene verification and correction (FIG. 15) to scene attribute edit (FIG. 16) or representative frame change (FIG. 17). The specification is provided by clicking one of the shrunken images 33 in the scene change point verification and correction mode. If the specification provided by the cursor 55 conflicts with that provided by the mouse cursor, the predetermined specification of higher priority is used.

The operations of the scene editor in the three modes are described below in detail. First, in the scene change point verification and correction mode, as shown in FIG. 15, the scene chart 30 also occupies in the edit area 45. In this mode, on the basis of scene change probability, a control signal causing a high-speed display before and after a scene change of high probability and a slow display preceding and following a scene of low probability is sent to the LD player 17, thereby controlling the display speed of the motion image.

The scene editor accepts commands for correcting a scene change point, that is, a command for adding a scene change point that has not been detected by the scene change detection unit 11, and a command for canceling a scene change point that has been erroneously detected.

To add a scene change point, the user uses the input device 15 to instruct that the motion image should be frozen at a frame in which the scene has changed, and subsequently selects the command for adding a scene change point, shown in the edit command area 46. In response to this, the scene editor splits the scene, with specified frame as the scene change point. Now, let us suppose that scene T is split into scenes T1 and T2 by an operation for adding a scene change point, and that scene T1 is earlier in time. If the representative frame of scene T is not included in scene T1, for instance, the leading frame is treated as the default representative frame, and the image file 86 for that frame is created. The still image file 86 of scene T directly becomes the image file of scene T2. Conversely, if the representative frame of scene T is not included in scene T2, the leading frame, or the frame frozen at the user's instruction, is treated as the default representative frame, and a still image file 86 for that frame is created. The still image file 86 of scene T directly becomes the image file of scene T1. In either case, the records of scenes T1 and T2 are inserted into parts (a) and (c) of the scene information file 21 shown in FIG. 10, the record of the original scene T is deleted, and the scene chart 30 is updated on the basis of part (a) of the updated scene information file 21.

To cancel a scene change point, the user specifies the extent of scenes merged into one scene by clicking a plurality of continuous scenes or by specifying the initial and final scenes with the frame interval cursor 56. Subsequently the user specifies the representative frame of the new scene. This is done by clicking the shrunken image 33 of the representative frame of any of the scenes to be merged, or by freezing the video image displayed on the monitor 18 at a desired frame, and subsequently selecting the command for canceling scene change points, shown in the edit command area 46. In response to these specifications, the scene editor merges the specified scenes into a single scene, and the specified frame is defined as its representative frame. If no representative frame is specified, the earliest of the representative frames included in the interval for which merging is performed is selected. In this case, the record of the new scene is inserted into part (a) of the scene information file 21, and the records of the old, merged scenes are deleted, while the scene chart 30 is updated according to the contents of part (a) of the updated scene information file 21.

Thus, in the scene change point verification and correction mode, the precision with which scene change points are detected can be substantially increased by setting the range of the degree of change within which detection failure and erroneous detection occur, and by having the user reobserve the frames preceding and following a scene change point that is included in the range. Furthermore, limiting the range makes the amount of labor required much less than that needed to observe all the scene change points. In addition, controlling the motion image display speed according to the probability of scene change reduces the number of complicated display control operations by the user, and thus makes the verification and correction work more efficient.

The scene attribute edit mode is now described. In this mode, the scene attribute edit panel exemplified in FIG. 16 is displayed. The edit area 45 of this panel consists of a scene hierarchy display area 60 and a scene attribute input area 61. By using the cursor 55 to designate a representative frame in the scene chart 30, or by designating a node of the scene hierarchy tree displayed in the scene hierarchy display area 60, the user specifies a scene, whose attributes he or she wishes to describe, subsequently keys in scene attributes such as a title and a description of the contents, in the scene attribute input area 61, and selects an attribute recording command in the edit command area 46. The scene editor executes this command to store attribute data on the designated scene in the attribute field of the record maintained in part (c) of the scene information file 21.

Finally, the representative frame change mode is described. In this mode, the attribute and representative frame change panel exemplified in FIG. 17 is displayed. The edit area 45 of this panel includes a candidate image display area 62, capture button 63, and registration button 64. In this mode, the user specifies that the representative frame of a scene should be changed to another frame of the scene. The specification of operation includes issuance of instructions for freezing the motion image on the monitor 18, and subsequent clicking of the frame capture button 63. In response to the specification, the scene editor inputs a video image from the motion image storage and display unit 10, creates a still image file of the specified frame, and displays its image in the candidate image display area 62. In response to the subsequent clicking of the registration button 64, the scene editor adds the still image file 86 of a new representative frame to the representative frame file 22, updates part (a) of the scene information file 21 in order to update the representative frame number 84 of the particular scene, and displays the still image of the new representative frame at the corresponding position in the representative frame display area 30.

Figure 18A:
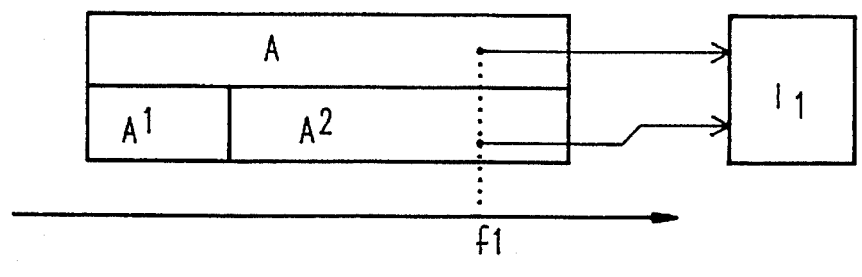
FIG. 18 is a diagram showing a representative frame change and its propagation.
Figure 18B:
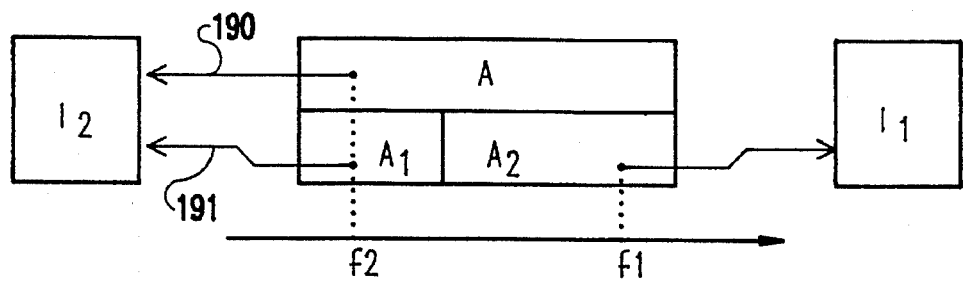

A change of the representative frame of a scene is propagated to the scene's parent and child scenes in the scene hierarchy. The example in FIG. 18 shows the states before and after a change of the representative frame of a scene that has child scenes. When the representative frame of scene A is changed from f1 to f2 (<f1), the representative frame of child scene A1 of A is also changed to f2, because A1 includes frame f2. Accordingly, the pointer 191 of A1 to the image file points to the same address as the pointer 190 of A. The change of the representative frame of the parent scene is similarly propagated to child scenes as far as leaf node scenes. Simultaneously, the change of the representative frame of scene A is propagated to its parent scene if the representative frame of a scene that is the parent of A is included in A. The change of the representative frame of the child scene is similarly propagated to parent scenes as far as the root node scene.

(2) Scene Hierarchy Editor

Figure 1A:
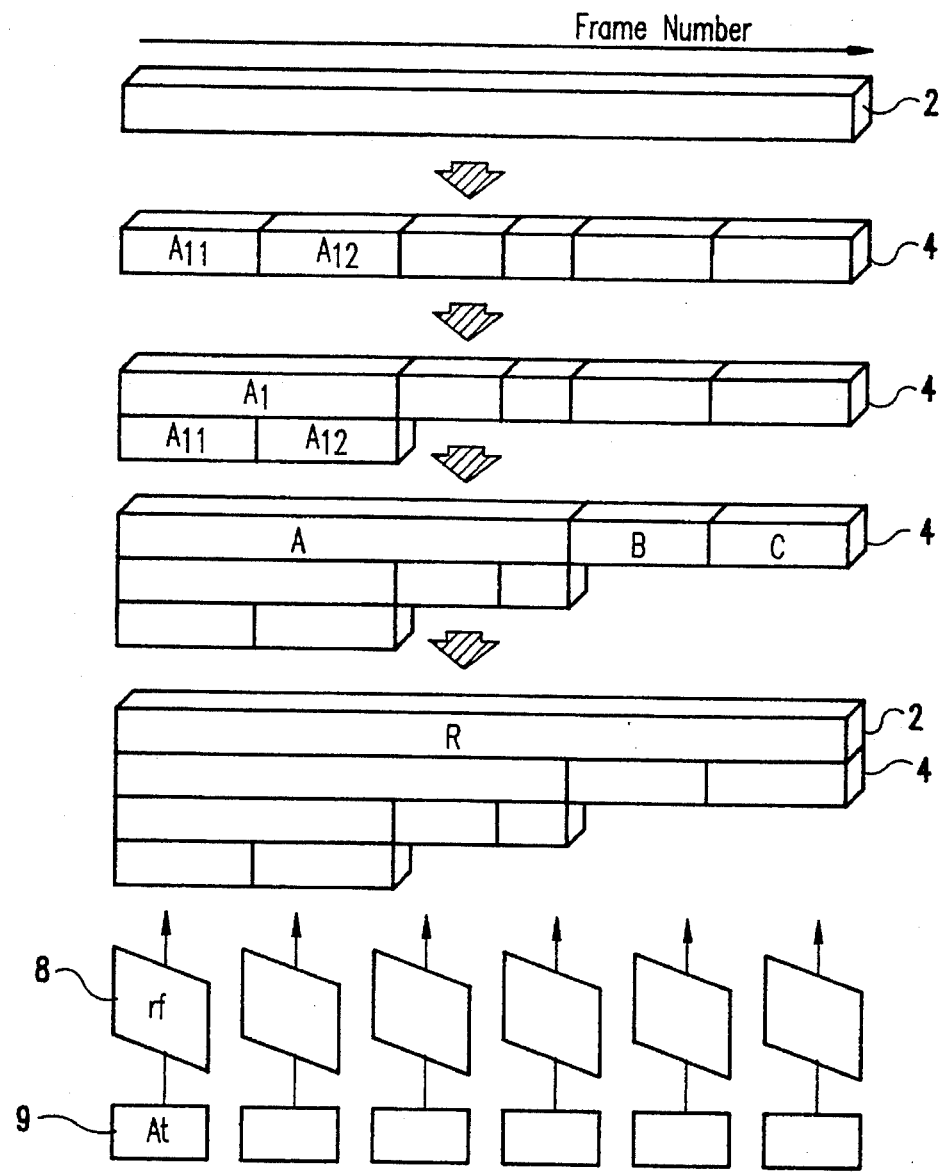
FIG. 1 is a diagram showing an example (bottom-up) of the concept of motion image management.
Figure 1B:
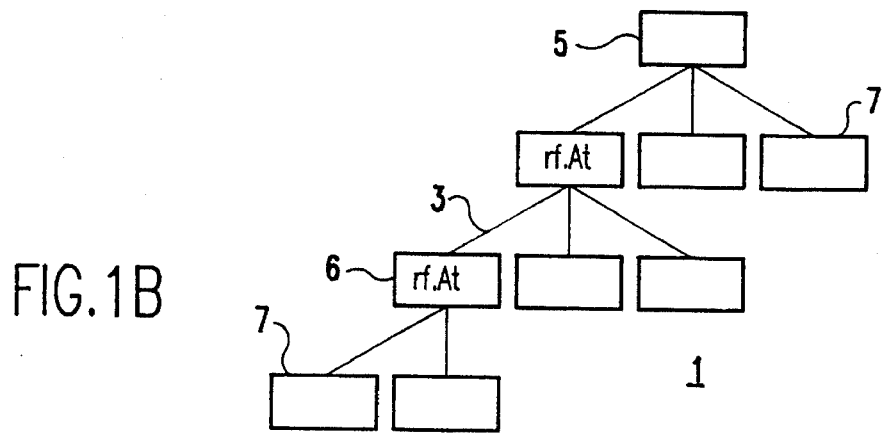
Figure 2:
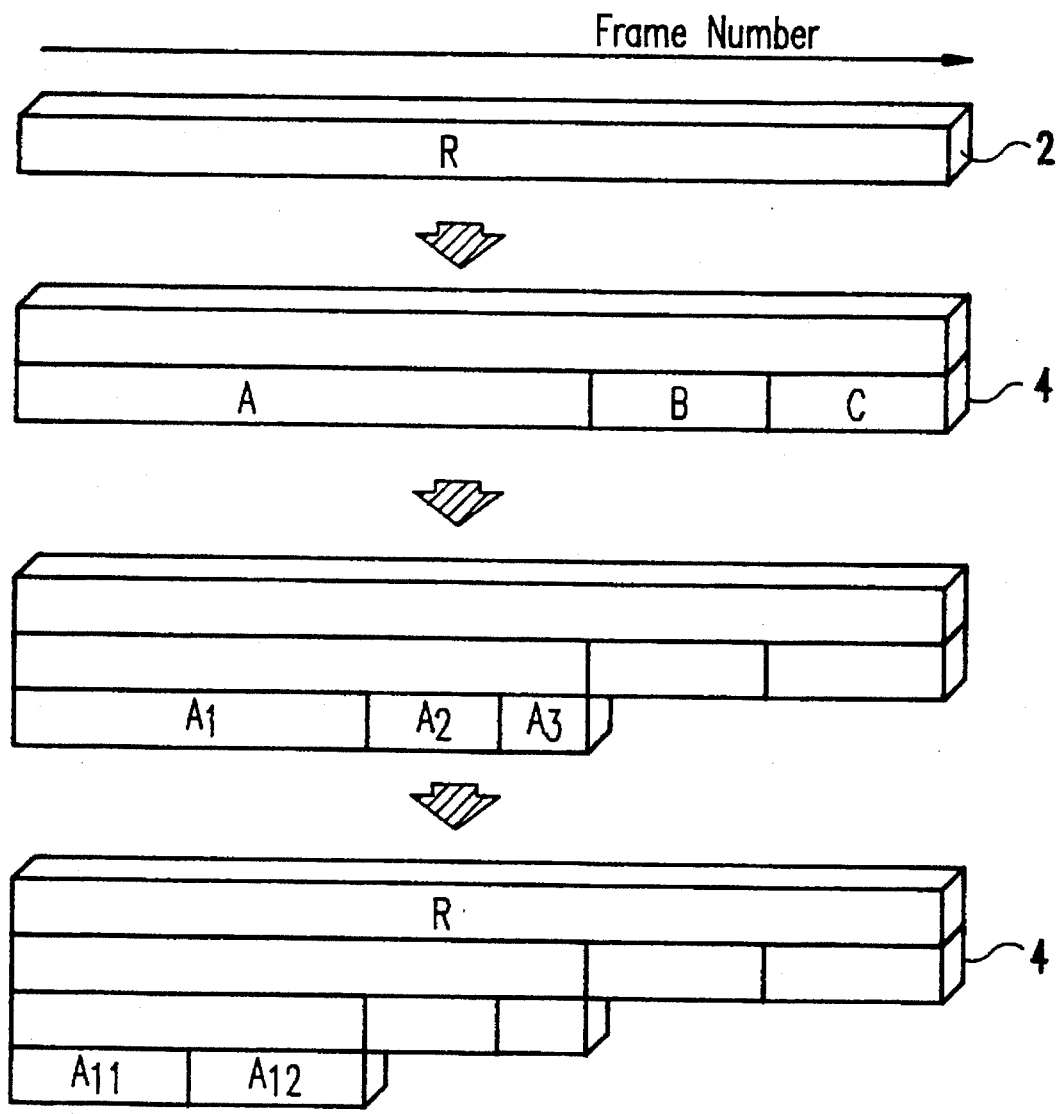
FIG. 2 is a diagram showing an example (top-down) of the concept of motion image management.
Figure 19:
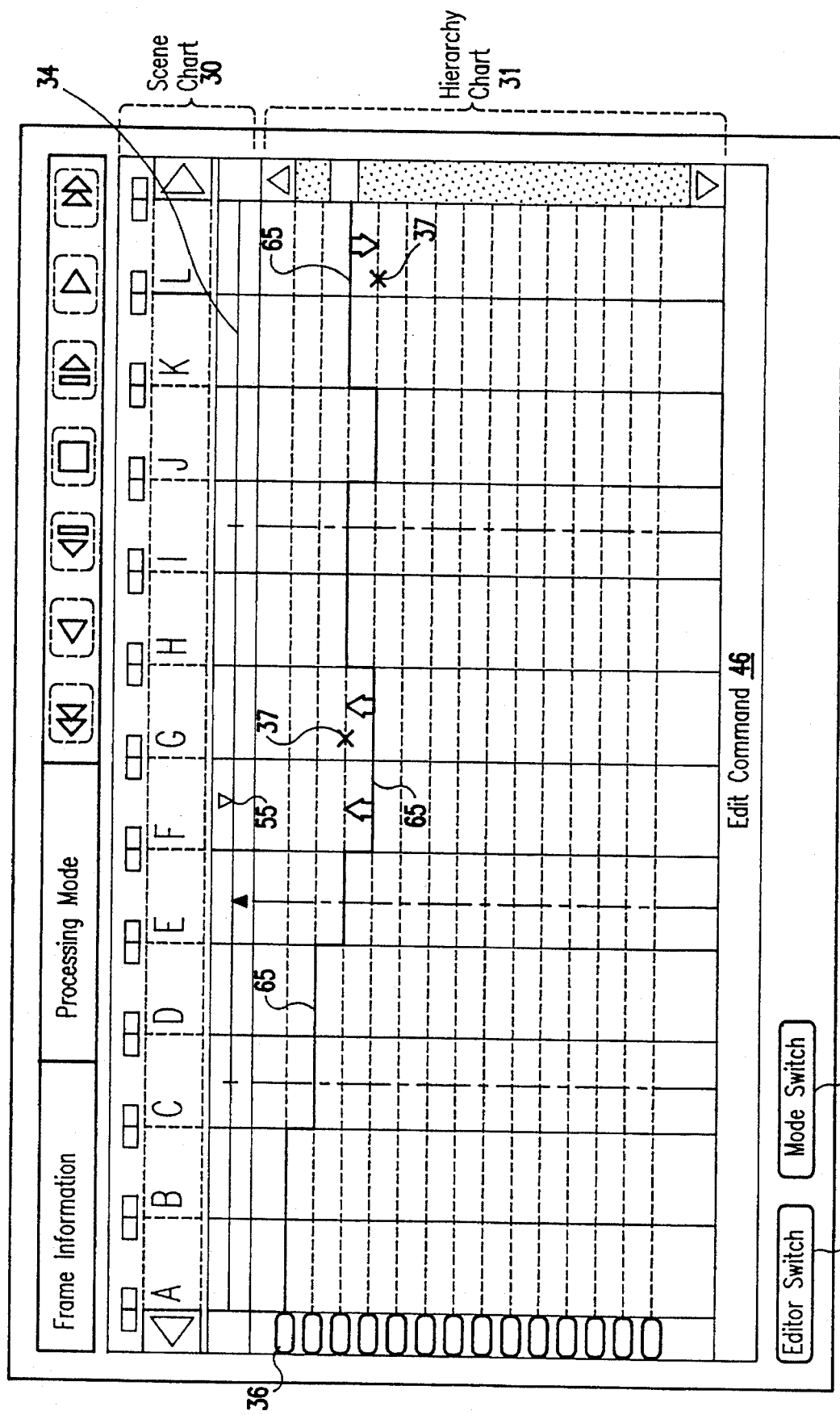
FIG. 19 is a diagram showing a panel display example of the scene hierarchy editor.

If the user presses the editor switch button 59 in the panels shown in FIGS. 15 to 17, the scene editor is initiated, and as exemplified in FIG. 19, the scene chart 30 is displayed in an area in the upper portion of the panels and the hierarchy chart 31 showing scene hierarchy information is displayed in another area, in the lower portion. By default, all the scenes are subjected to display, but the user may previously limit displayed scenes to those are to become leaves or scenes of a specific hierarchy depth. In FIG. 19, only scenes that become leaves are displayed. In the initial state of the hierarchy chart, one depth is shown, with the whole motion image viewed as a parent scene and with each scene split by the scene change detection unit 11 viewed as a child scene. From this initial state hierarchy, the user inputs commands for changes in the scene hierarchy, such as splitting and merging of input scenes to create a complicated hierarchy for the scenes and they are executed. FIG. 20 shows the hierarchical relationship corresponding to FIG. 19 in a manner similar to FIG. 2. The scenes A to L for which the shrunken image 33 of the representative frame is shown in FIG. 19 correspond to scenes S1, S2, S31, S32, S331, S3321, S3322, S333, S334, S3351, S336, and S337, respectively.

A scene hierarchy change command is input directly by the user manipulating an object on the display panel. Specifically, the user performs the following operation. First, he specifies a scene to be manipulated by setting a cursor 55 or 56 on the time bar 34 or by clicking the shrunken image 33. Subsequently, he performs one of the following operations.

a) When the box 36 representing the scene depth is clicked, the hierarchy bar 65 is moved to that depth.

b) When the position 37 of the hierarchy bar 65 on the hierarchy chart 31 is directly specified, the hierarchy bar 65 is moved to that position 37.

c) A split command is selected in the edit command area 46. In this case, the split point is indicated by the work frame cursor 55 on the time bar 34.

d) A merge command is selected in the edit command area 46.

e) Dragging the hierarchy bar 65 with the mouse directly moves the bar vertically.

If the hierarchy bar 65 of scenes F and G shown in FIG. 19 is raised by one level, and the hierarchy bar 65 of the scene L is lowered by one level, as shown by the arrows, the hierarchy relationship is changed as shown in FIG. 21.

If a new scene is created by a change of the scene hierarchy relationship, records related to the scene are added to parts (a) and (b) of the scene information file 21 shown in FIG. 10. In addition, if a new parent-child relationship is created, a pair of identifiers of the parent and child scenes is added to part (b) of the file 21.

Figure 22A:
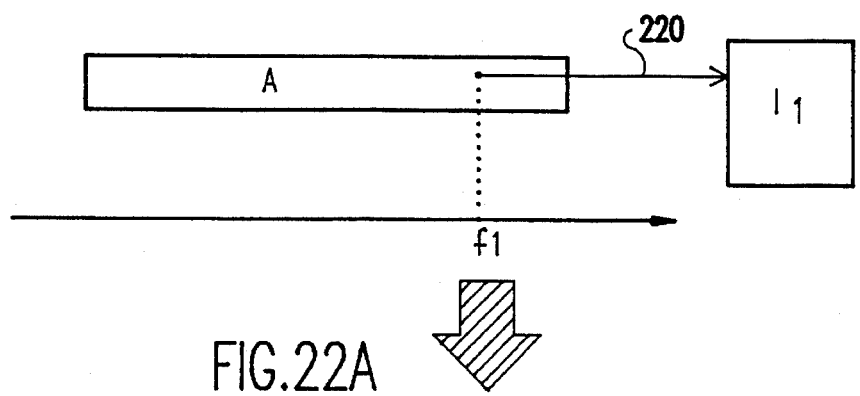
FIG. 22 is a diagram showing a change in the hierarchy tree and its propagation.
Figure 22B:
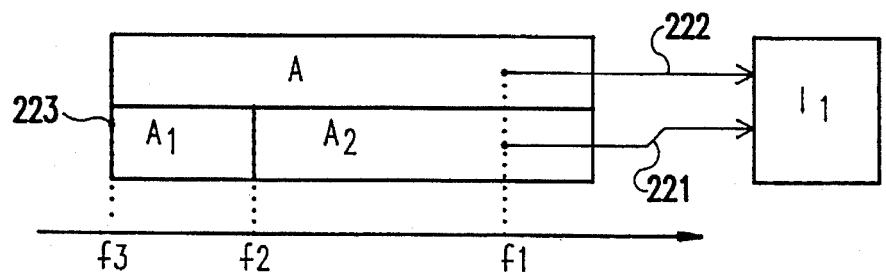

The representative frames of child scenes that are newly created when a scene is split are automatically established on the basis of the representative frame of the parent scene. The example shown in FIG. 22 shows the states before and after the establishment of the representative numbers of child scenes A1 and A2 and pointers to the image file, when scene A having frame f1 as a representative frame is split at frame f2 (<f1) to create child scenes A1 and A2. The representative frame of A is f1, which has a reference pointer 220. Since the frame f2 at which splitting is performed has a frame number lower than f1, the representative frame of A1 is the leading frame f3, which is a default, and the representative frame of A2 becomes f1, which is also the representative frame of A. Further, the pointer 221 for A2 to the image file points to the same address as the pointer 222 for A. There is an empty pointer 223 for A1, but, when the image file of frame f3 is created, it is replaced by the address of the file. Conversely, if scenes A1 and A2 are merged into A, whichever of the representative frames of A1 and A2 is selected by the user becomes the representative frame rf of A.

(3) Scene Keyword Editor

Figure 23:
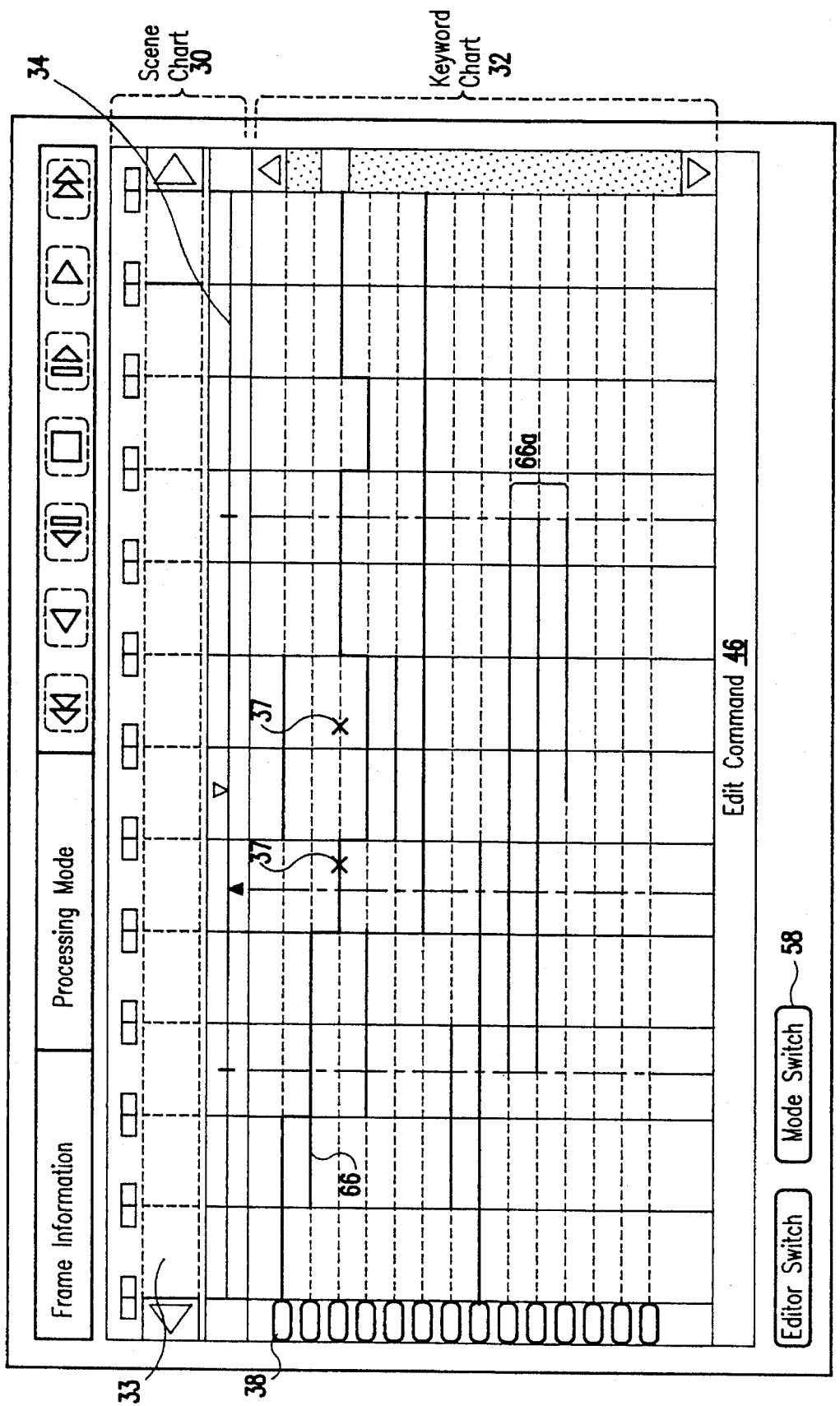
FIG. 23 is a diagram showing a panel display example in the scene keyword assign mode of the scene keyword editor.

Scene keyword editor operates in scene keyword assign mode and keyword attribute/image input mode. It changes the mode in response to the specification selecting the mode switch command 58, and displays the panels exemplified in FIGS. 23 and 24. In changing from the scene keyword assign mode to the keyword attribute/image input mode, it receives specification of the target keyword from the user.

First, the scene keyword assign mode is described. In this mode, as exemplified in FIG. 23, the scene chart 30 is placed in an area in the upper portion of the panel, and the keyword chart 32 is placed in another area, in the lower portion. By directly manipulating an object on the display panel to draw a keyword bar 66, the user inputs a command for assigning a keyword to a scene. Specifically, he performs one of the following procedures.

a) A frame interval or scene is specified in the scene chart 30. Subsequently, a box 38 representing a desired keyword is clicked. The editor interprets this as a cancel command for keyword assignment if the specified keyword has already been assigned to the specified scene; otherwise it interprets it as a keyword assign command.

b) On the keyword chart 32, the positions 37 of both ends of the keyword bar 66 that is desired to be redrawn are directly specified.

c) Two frame intervals are established in the scene chart 30. Subsequently, in the edit command area 46, a command is selected for cutting the keyword bars 66 out of one interval and pasting them into the other.

d) Two boxes 38 are specified in the scene chart 30 to specify two keywords. Subsequently, in the edit command area 46, a command is selected for copying one keyword for all the intervals to which the other keyword is assigned.

e) The bar length is changed by dragging the end points of the existing keyword bar 66.

When a command for assigning or canceling a keyword is input in this way, the scene keyword editor executes it to update the scene information file 21 (c) shown in FIG. 10. It should be noted that the use of this editor allows scenes that have not been identified in the scene hierarchy tree (file 21 (b)) to be specified. The keyword bars 66A in FIG. 23 correspond to such scenes. If a scene that has not been identified in the scene hierarchy tree is specified for the first time, the scene keyword editor adds a new record to the scene information file 21 (c).

Figure 24:
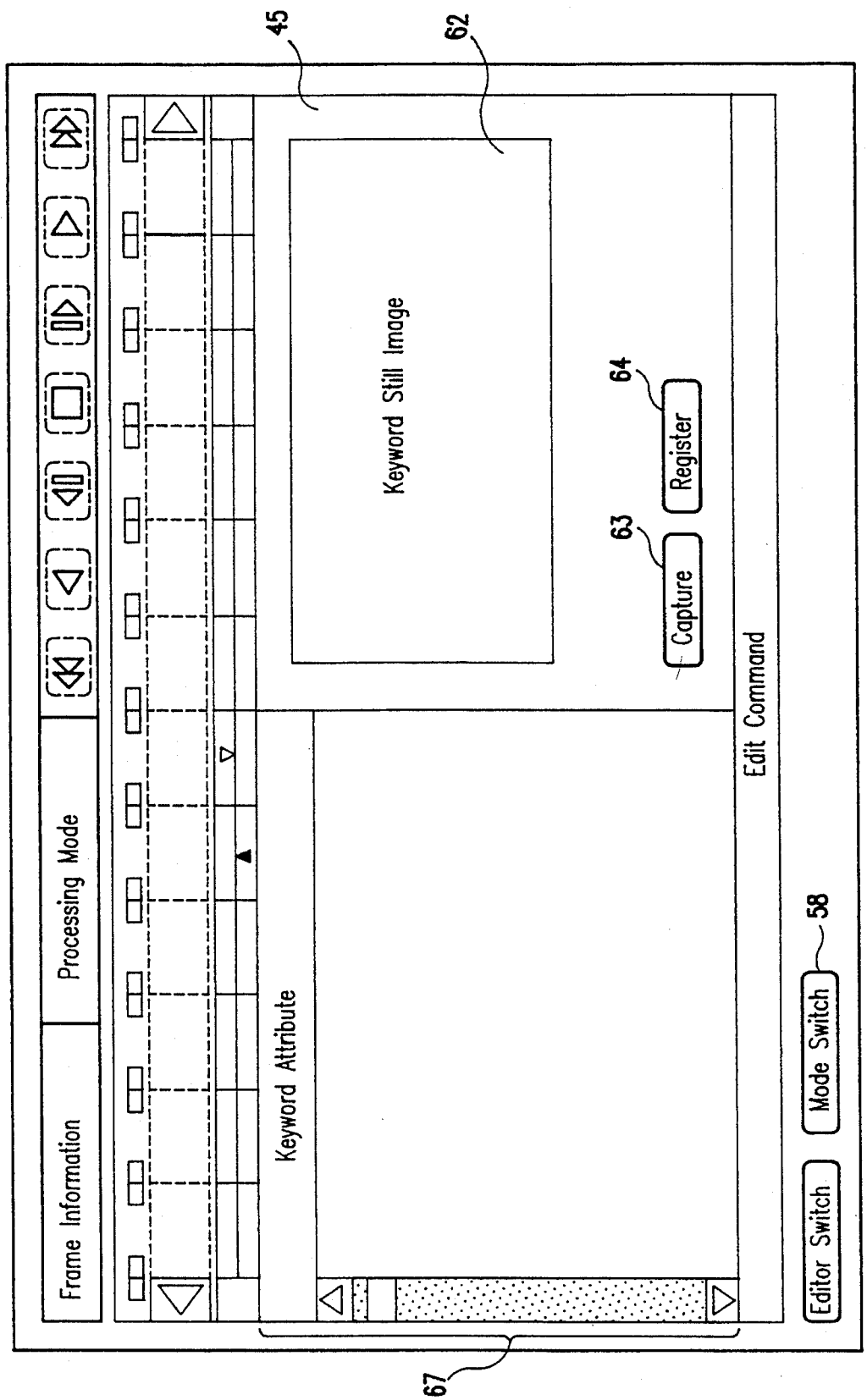
FIG. 24 is a diagram showing a panel display example in the keyword attribute/image input mode of the scene keyword editor.

The keyword attribute/image input mode is now described. In this mode, the keyword attribute/image input panel exemplified in FIG. 24 is displayed. The scene attribute input area 61, candidate image display area 62, capture button 63, and registration button 64 are placed in the edit area 45.

The files that the scene keyword editor edits in this mode are the keyword information file 25 and the representative file 26, both shown in FIG. 8. In the keyword information file 25, the identifier, attribute, and storage address in the still image file are stored in one record for each keyword. The keyword image file 26 is a collection of still image files that are created for each keyword. If the user wants to provide an attribute to a keyword, he keys in the attribute and selects an input command, using the same operation as for the scene attribute edit panel. In addition, when a keyword image is selected from a video image frame, the user inputs the commands for capturing and registering the frame functioning as the keyword by using the same operation as for the representative frame change panel. The editor executes those commands to edit the files 25 and 26.

(4) Cross Editor

Figure 25:
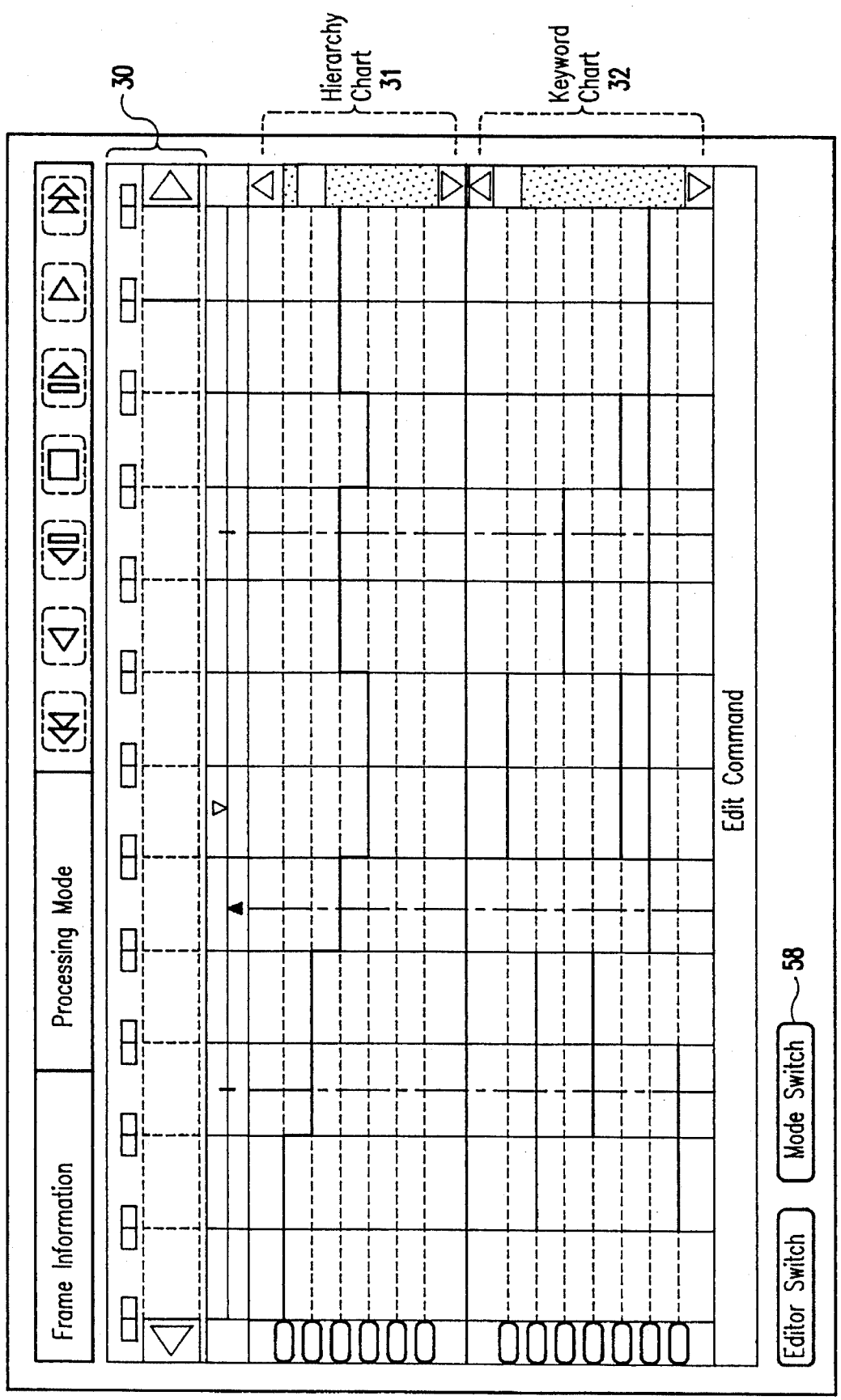
FIG. 25 is a diagram showing a panel display example of the cross editor.

As exemplified in FIG. 25, the cross editor places the hierarchy chart 31 and keyword chart 32 in the same panel as the scene chart 30, and accepts direct manipulation of an object in the hierarchy chart 31 or keyword chart 32. This editor operates in the cross-reference mode, cross pointing mode, or interlocking mode. Each mode includes a mode in which an object in the hierarchy chart is manipulated, and a mode in which an object in the keyword chart is manipulated. That is, the number of operation modes of the cross editor is essentially six, and those modes circularly switch in response to the specification of the selecting mode switch button 58.

In the cross-reference mode, the user cross-refers to the scene hierarchy and the scene keyword, and specifies the editing by means of the same operation as for the scene hierarchy editor or scene keyword editor. The cross editor updates the chart in which the object was manipulated, and updates the corresponding scene information.

Figure 26:
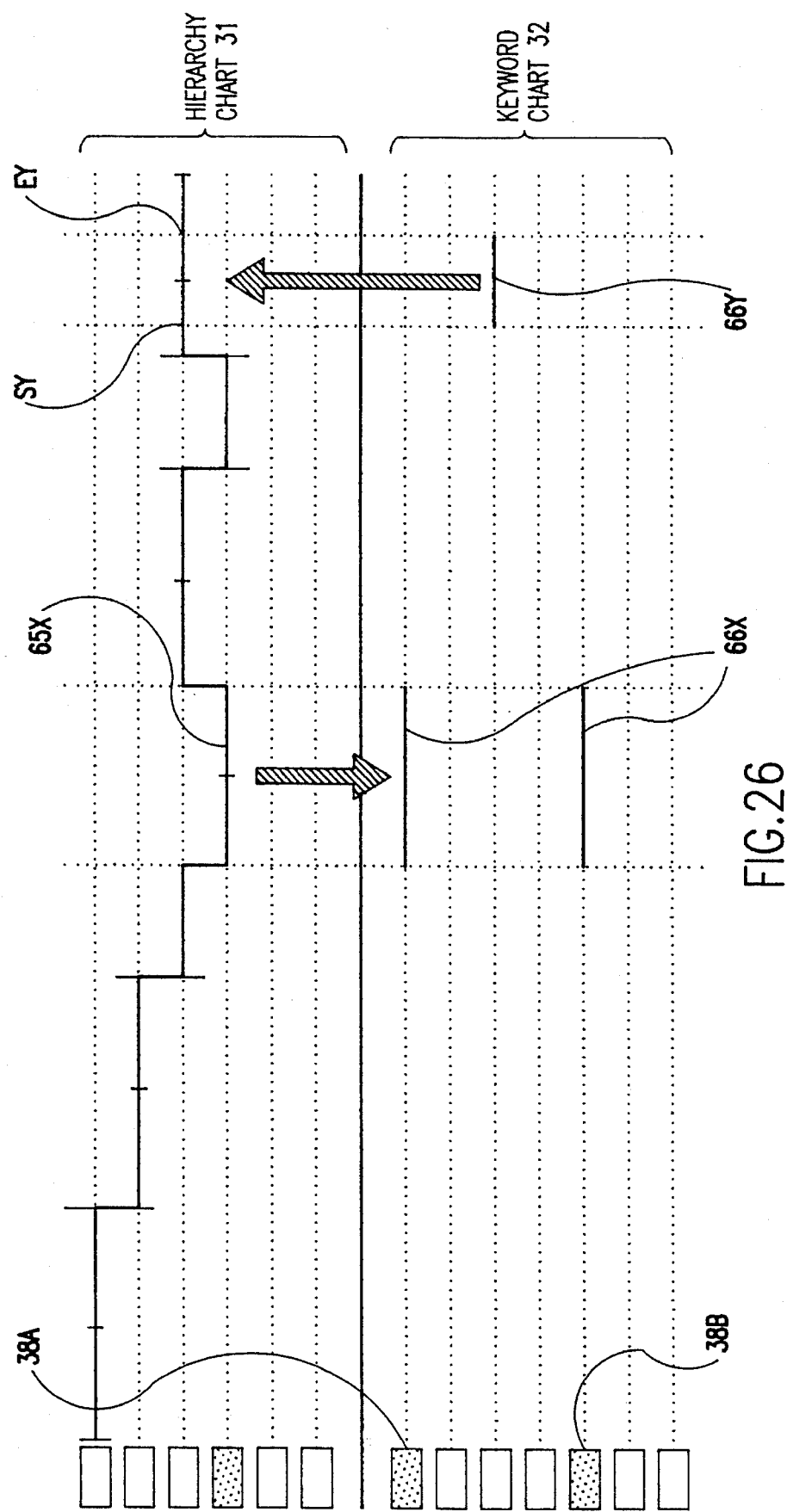
FIG. 26 is a diagram showing an example of edit command input by object manipulation in the cross editor.

In the cross-pointing mode, the cross editor updates the hierarchy chart 31 and edits the scene information file 21 in response to direct manipulation of an object in the keyword chart 32, or conversely, it updates the keyword chart 32 and edits the scene information file 21 in response to direct manipulation of an object on the hierarchy chart 31. For instance, the manipulation shown by a downward arrow in FIG. 26 is an instance of the former operation, in which the specification of the hierarchy bar 65X in the hierarchy chart 31 is accepted as the specification of the keyword bar 66X. That is, if the user specifies the hierarchy bar 65X in the hierarchy chart 31 after specifying the boxes 38A and 38B in the keyword chart 32, the cross editor displays the keyword bar 66X in the keyword chart 32 and updates the scene information file 21 (c) accordingly. Alternately, the user may directly drag the bar 65X to draw the bar 66X. Further, the manipulation shown by an upward arrow in FIG. 26 is an instance of the latter operation, in which the specification of the keyword bar 66Y is accepted as a command for splitting a scene at the starting frame SY and ending frame EY, respectively, of the corresponding interval in the hierarchy chart 31.

In the interlocking mode, the cross editor simultaneously updates scene hierarchy information and keyword assignment information in response to manipulation of an object on either chart. For instance, in the editing keyword chart 32, it updates the hierarchy chart 31 so that a scene is split at the starting and ending frames of an interval that was assigned a keyword, interlocking with the manipulation of an object on the keyword chart 32, and thereby updating parts (a), (b), and (c) of the scene information file 21.

Thus, during the inputting of scene information, a user interface is provided for visually displaying scene information in the form of the hierarchy chart and keyword chart along with the still image of the representative frame, so that the user can grasp scene information intuitively and any erroneous input is immediately fed back. In addition, by means of an interface for directly manipulating an object on the displayed chart, the frequency of key-ins and erroneous operations at the time of input is decreased, as a result of which the input operability is increased. In command input operations for verification and correction of scene change points, changes of the scene hierarchy, and inputting a scene keyword, the work can be clearly seen thanks to the interface for cross-referring to scene information. In addition, by using an interface that interprets one command input operation as an edit command to different kinds of scene information files, the user can save time and labor in checking the consistency of data in those files, and the burden on the user of verifying input information is lightened.

Finally, the operation of the registration processing unit 13 shown in FIG. 8 is described. The registration processing unit 13 is initiated by clicking the registration button 68 in the editor/mode switch area 47. For instance, it is assumed that the database unit 23 manages a relational database such as DB2 (trademark) of IBM. In this case, according to the user's previous definition of columns and data types of relations in a motion image database 24, the unit 13 generates a command for loading the scene information file 21 into the relations on the basis of the specification and the value of the corresponding column of the scene information file 21, and sends it to the database unit 23. The unit 23 executes the command to load the relations into the database 24. Alternatively, the unit 13 generates a command to insert records into the relations of the database 24 for each record in the scene information file, and causes the unit 23 to execute it.

In order to perform motion image retrieval by using the still image of a representative frame as in the above-identified prior patent application No. 4-21443, information for accessing a still image file 86 is passed to the unit 23. A command for loading the still image file is also generated by using that information and transferred to the unit 23 for execution. Alternatively, in order to perform motion image retrieval by using keywords as in the above prior patent application No. 4-65620, it is convenient if the motion image database 24 has keyword information and keyword images. In this case, commands for loading the files 25 and 26 are generated in a manner similar to that for loading the scene information file 21 and the representative frame file 22, and sent to the unit 23.

Thus, the scene information input technique according to the present invention is widely applicable without being limited to a particular database unit for registration and is also highly flexible in response to change of the file structure of the registrating database.

In accordance with the present invention, it becomes easy to construct multimedia databases mainly for storing motion images, for which the demand is expected to increase in future.

Having thus described our invention, what we claim as new, and desire to secure by Letters Patent is:

1. A computer system for inputting information on scenes that are portions of a motion image, said motion image consisting of a linear sequence of frames and scenes, each said scene being a continuous sequence of said frames, comprising:

(a) means for storing motion image data,
   (b) input means,
   (c) display means having a display surface,
   (d) database means,
   (e) means for detecting scene changes in motion image data extracted from said means (a),
   (f) means for generating scene information according to the detected scene changes and storing said scene information in a scene information file,
   (g) means for causing graphical display of scene information on the display surface of said display means,
   (h) means for executing an edit command input by a user operating said input means to edit said scene information file, at least some of said edits serving to apply to said scenes in said information file attributes of semantic scene contents, each said attribute applying to a continuous sequence of one or more said scenes, and
   (i) means for generating a command executable by said database means for registering scene information in said scene information file, and sending the generated command to said database means.

2. In a motion image processing system comprising, in combination, means for storing motion image data, input means, display means having a display surface, and database means, a method for providing information on scenes that are portions of a motion image and registering said information in a scene information file, said motion image consisting of a linear sequence of frames and scenes, each said scene being a continuous sequence of said frames, said method comprising the steps of:

(a) extracting motion image data from said means for storing motion image data in order to detect scene changes,
   (b) generating scene information according to the detected scene changes and storing said scene information in a scene information file,
   (c) displaying objects representing scene information on the display surface of said display means,
   (d) interpreting the manipulation of said objects performed by a user operating said input means, in order to update said scene information file, some of said manipulations serving to apply to said scenes in said information file attributes of semantic scene contents, each said attribute applying to a continuous sequence of one or more said scenes, and
   (e) registering the scene information contained in said scene information file in the database.

3. A computer system for inputting information on scenes that are portions of a motion image, said motion image consisting of a linear sequence of frames and scenes, each said scene being a continuous sequence of said frames, comprising:

(a) data storage means,
   (b) a representative frame file stored in said storage means for storing still image data of representative frames, at least one representative frame being associated with each scene of said motion image,
   (c) a scene information file stored in said storage means for storing the information on said scenes,
   (d) input means,
   (e) display means having a display surface
   (f) means for extracting from said representative frame file still image data of representative frames for a plurality of scenes, and causing display of the still images of the representative frames in a first area of the display surface of said display means, said still images being arranged linearly,
   (g) means for extracting from said scene information file scene information related to said plurality of scenes, and causing display of said scene information in a second area of said display surface, and
   (h) means for executing an edit command input by a user operating said input means, thereby causing the editing of said scene information file, at least some of said editing serving to apply to said scenes in said scene information file attributes of semantic scene contents, each said attribute applying to a continuous sequence of one or more said scenes, wherein said scene information is information indicating a hierarchical relationship of said linear sequence of scenes, and said means (g) causes graphical display of said hierarchical relationship of scenes.

4. A computer system for inputting information on scenes that are portions of a motion image, comprising:

(a) data storage means,
   (b) a representative frame file stored in said storage means for storing still image data of representative frames, at least one representative frame being associated with each scene of said motion image,
   (c) a scene information file stored in said storage means for storing the information on said scenes,
   (d) input means,
   (e) display means having a display surface,
   (f) means for extracting from said representative frame file still image data of representative frames for a plurality of scenes, and causing display of the still images of the representative frames in a first area of the display surface of said display means, said still images being arranged linearly,
   (g) means for extracting from said scene information file scene information related to said plurality of scenes, and causing display of said scene information in a second area of said display surface, and
   (h) means for executing an edit command input by a user operating said input means, thereby causing the editing of said scene information file, wherein said scene information is information indicating keywords allocated to scenes by a keyword allocation means, and said means (f) causes display of a time axis area along the sequence of still images of said representative frames in said first area, and said means (g) causes graphical display of the keywords that are allocated to scenes corresponding to segments of said time axis.

5. A computer system as set forth in claim 4 further comprising:

(i) a keyword information file stored in said data storing means for storing information on keywords allocated to scenes by a keyword allocation means, (k) means for retrieving information on said keywords from said keyword information file, and causing display of said information in the second area of said display surface, and (l) means for executing an edit command input by the user operating said input means to edit said scene information file, wherein a mode in which said means (g) and (h) operate and a mode in which said means (k) and (l) operate change in response to specification by the user operating said input means.

\* \* \* \* \*